US012591249B1

(12) United States Patent
Derouez

(10) Patent No.: US 12,591,249 B1
(45) Date of Patent: Mar. 31, 2026

(54) AI-POWERED VEHICLE

(71) Applicant: KING FAISAL UNIVERSITY, Alhasa (SA)

(72) Inventor: Faten Mouldi Derouez, Alhasa (SA)

(73) Assignee: KING FAISAL UNIVERSITY, Alhasa (SA)

( * ) Notice: Subject to any disclaimer, the term of this patent is extended or adjusted under 35 U.S.C. 154(b) by 0 days.

(21) Appl. No.: 19/396,309

(22) Filed: Nov. 20, 2025

(51) Int. Cl.
| | |
|---|---|
| *G05D 1/225* | (2024.01) |
| *F02D 41/26* | (2006.01) |
| *G07C 5/00* | (2006.01) |
| *G05D 101/15* | (2024.01) |

(52) U.S. Cl.
CPC .......... *G05D 1/225* (2024.01); *F02D 41/266* (2013.01); *G07C 5/008* (2013.01); *G05D 2101/15* (2024.01)

(58) Field of Classification Search
CPC .. G05D 1/225; G05D 2101/15; F02D 41/266; G07C 5/008; G06N 3/08; H04L 9/50; G05B 13/027
See application file for complete search history.

(56) References Cited

U.S. PATENT DOCUMENTS

| | | | | |
|---|---|---|---|---|
| 10,353,691 | B2 * | 7/2019 | Richter ...................... | G06F 8/65 |
| 12,444,248 | B2 * | 10/2025 | Heichelbech .......... | G06Q 50/40 |
| 2016/0131069 | A1 * | 5/2016 | Wackerle ............ | F02D 41/2429 |
| | | | | 701/115 |

| | | | | |
|---|---|---|---|---|
| 2019/0325671 | A1 * | 10/2019 | Takasu ................. | G07C 5/0808 |
| 2020/0248641 | A1 * | 8/2020 | Nakamura ........... | G06N 3/0499 |
| 2022/0136474 | A1 * | 5/2022 | Ostrowski ................ | G06N 3/08 |
| | | | | 123/179.4 |

FOREIGN PATENT DOCUMENTS

| | | |
|---|---|---|
| IT | 20110002 U1 | 3/2013 |
| JP | 4786582 B2 | 3/2007 |
| JP | 5783506 B2 | 12/2011 |

OTHER PUBLICATIONS

Havugimana et al., "Review of Artificial Intelligent Algorithms for Engine Performance, Control, and Diagnosis", Energies 2023, 16, 1206, First available online on Jan. 22, 2023.

Bhatt et al., "Application of Artificial Neural Network for Internal Combustion Engines: A State of the Art Review", Arch Computat Methods Eng 29, 897-919 (2022), First available online on May 3, 2021.

Kenanoğlu et al., "Performance & emission analysis of HHO enriched dual-fuelled diesel engine with artificial neural network prediction approaches", International Journal of Hydrogen Energy, vol. 45, Issue 49, 2020, First available online on Mar. 13, 2020.

* cited by examiner

*Primary Examiner* — George C Jin

(74) *Attorney, Agent, or Firm* — Nath, Goldberg & Meyer; Joshua B. Goldberg

(57) ABSTRACT

A system includes a primary cloud-based data repository; an internal combustion engine; a catalytic converter; a primary data acquisition unit; an electronic control unit (ECU); a telematics control unit (TCU); a primary artificial intelligence module within a primary cloud server; and a secondary cloud server configured to receive and transmit the trained at least one engine data and the at least one oxygen amount data from the primary artificial intelligence module to the ECU, respectively, via the TCU thereby allowing the ECU to adjust at least one engine parameter.

20 Claims, 11 Drawing Sheets

585

490

580

485

495

505

AI-POWERED VEHICLE

FIELD AND BACKGROUND

The disclosure of the present application relates to a system, and particularly to a system and a method for adjusting at least one engine parameter in a vehicle.

DESCRIPTION OF RELATED ART

Conventional automotive engines rely predominantly on petroleum-based lubricants and fuels, such as mineral oils and synthetic hydrocarbons, to ensure smooth operation, reduce wear, and manage thermal conditions within engine components. While these materials have been optimized over decades of industrial development, they present several disadvantages, including environmental pollution, limited renewability, and dependency on non-sustainable fossil resources.

In recent years, increasing emphasis on sustainable and eco-friendly energy sources has led to exploration of bio-based alternatives for engine lubrication and combustion. Among such alternatives, waste cooking oil and frying oil have been studied as potential biofuels due to their abundance, biodegradability, and relatively high energy content. However, direct use of frying oil in engines presents multiple challenges, such as inconsistent viscosity, contamination from food particles and degradation byproducts, and variable chemical composition caused by repeated thermal exposure. These factors can result in inefficient combustion, engine deposits, corrosion, and mechanical instability.

Traditional processing techniques such as filtration, esterification, and transesterification have been proposed to convert used cooking oils into biodiesel or lubricants. However, these methods often require extensive chemical processing, yield inconsistent results depending on feedstock quality, and fail to dynamically adapt to changing engine conditions in real time.

Artificial intelligence (AI) and machine learning (ML) technologies have recently emerged as powerful tools for optimizing complex chemical and mechanical systems. In the context of biofuel processing and engine performance, AI can be applied to predict oil degradation, optimize blend ratios, and control real-time engine parameters for improved efficiency and reduced emissions.

Nonetheless, there remains a need for an integrated system and method that utilize AI to analyze, refine, and adaptively manage frying oil as a functional lubricant or fuel source for internal combustion engines, addressing variability in oil quality and ensuring stable engine performance.

SUMMARY

The present subject matter relates to a system which, in one embodiment, includes a primary cloud-based data repository configured to contain at least one of maintenance records data of a vehicle, weather data, and traffic data; a secondary cloud-based data repository; the vehicle, wherein the vehicle comprises: an internal combustion engine comprising at least one engine sensor; a catalytic converter comprising at least one oxygen sensor; a primary data acquisition unit configured to receive and condition signals from the at least one engine sensor and the at least one oxygen sensor; an electronic control unit (ECU) configured to receive the conditioned signals from the at least one engine sensor and the at least one oxygen sensor and generate at least one engine data and at least one oxygen amount data, respectively, therefrom; and a telematics control unit (TCU) configured to receive and transmit the at least one engine data and the at least one oxygen amount data from the ECU to the secondary cloud-based data repository, respectively; a primary artificial intelligence module, within a primary cloud server, configured to receive and train the at least one engine data and the at least one oxygen amount data from the secondary cloud-based data repository and/or the at least one of maintenance records data of the vehicle, weather data, and traffic data from the primary cloud-based data repository; and a secondary cloud server configured to receive and transmit the trained at least one engine data and the at least one oxygen amount data from the primary artificial intelligence module to the ECU, respectively, via the TCU thereby allowing the ECU to adjust at least one engine parameter.

In an embodiment, the at least one engine sensor can be selected from the group consisting of a mass air flow sensor, a throttle position sensor, a crankshaft position sensor, a camshaft position sensor, a knock sensor, a manifold absolute pressure sensor, a coolant temperature sensor, an intake air temperature sensor, an oil pressure sensor, a vehicle speed sensor, other engine sensors, and a combination thereof.

In another embodiment, the primary data acquisition unit can be further configured to receive and condition at least one signal from at least one vehicle auxiliary sensor.

In an additional embodiment, the ECU can be further configured to receive the conditioned at least one signal from the at least one vehicle auxiliary sensor and generate at least one vehicle auxiliary data therefrom; and wherein the TCU can be further configured to receive and transmit the at least one vehicle auxiliary data from the ECU to the secondary cloud-based data repository, respectively.

In an additional embodiment, the primary artificial intelligence module can be further configured to receive and train the at least one vehicle auxiliary data from the secondary cloud-based data repository; and the secondary cloud server can be further configured to receive and transmit the trained at least one vehicle auxiliary data from the primary artificial intelligence module to the ECU, respectively, via the TCU.

In a supplementary embodiment, the at least one vehicle auxiliary sensor can be selected from the group consisting of a transmission sensor, a vibration sensor, a fuel sensor, a brake pressure sensor, a wheel speed sensor, an environmental sensor, a rain sensor, a light sensor, a temperature sensor, a radar sensor, a lidar sensor, a GPS sensor, an accelerometer sensor, a gyroscope sensor, other auxiliary sensors, and a combination thereof.

In a further embodiment, the system can further include a secondary data acquisition unit configured to receive and condition the at least one of maintenance records data of the vehicle, weather data, and traffic data from the primary cloud-based repository, and wherein the conditioned at least one of maintenance records data of the vehicle, weather data, and traffic data are transmitted to the secondary cloud-based data repository prior to the training step.

In an embodiment, the system can further include at least one traffic sensor which can be configured to send data to the primary cloud-based data repository to generate the traffic data, and the at least one traffic sensor can further be configured to receive the trained traffic data from the primary artificial intelligence module to regulate traffic flow.

In another embodiment, the at least one traffic sensor can be selected from the group consisting of a camera, a radar, an inductive loop, other traffic sensors, and a combination thereof.

In an additional embodiment, the ECU can include a secondary artificial intelligence unit embedded therein.

In a supplementary embodiment, the secondary artificial intelligence unit can be configured for image processing and/or verifying integrity of critical decision(s) made by the primary artificial intelligence module.

In a further embodiment, the TCU can include a tertiary artificial intelligence unit embedded therein.

In an embodiment, adjustment of the at least one engine parameter to be adjusted can permit the internal combustion engine of the vehicle to operate using an alternative fuel.

In another embodiment, the alternative fuel can include biofuel.

In an additional embodiment, the biofuel can include used cooking oil.

In a further embodiment, the present subject matter relates to a method of using the system of claim 1 for adjusting the at least one engine parameter of the vehicle, wherein the method includes receiving, via the primary cloud-based data repository, the at least one of maintenance records data of a vehicle, weather data, and traffic data; receiving and conditioning, via the primary data acquisition unit, the signals from the at least one engine sensor and the at least one oxygen sensor; receiving, via the ECU, the conditioned signals from the at least one engine sensor and the at least one oxygen sensor and generating the at least one engine data and the at least one oxygen amount data, respectively, therefrom; receiving and transmitting, via the TCU, the at least one engine data and the at least one oxygen amount data from the ECU to the secondary cloud-based data repository, respectively; receiving and training, via the primary artificial intelligence module, the at least one engine data and the at least one oxygen amount data from the secondary cloud-based data repository and/or the at least one of maintenance records data of the vehicle, weather data, and traffic data from the primary cloud-based data repository; and receiving and transmitting, via the secondary cloud server, the trained at least one engine data and the at least one oxygen amount data from the primary artificial intelligence module to the ECU, respectively, via the TCU thereby allowing the ECU to adjust the at least one engine parameter.

These and other features of the present subject matter will become readily apparent upon further review of the following specification.

DETAILED DESCRIPTION

Figure 1:
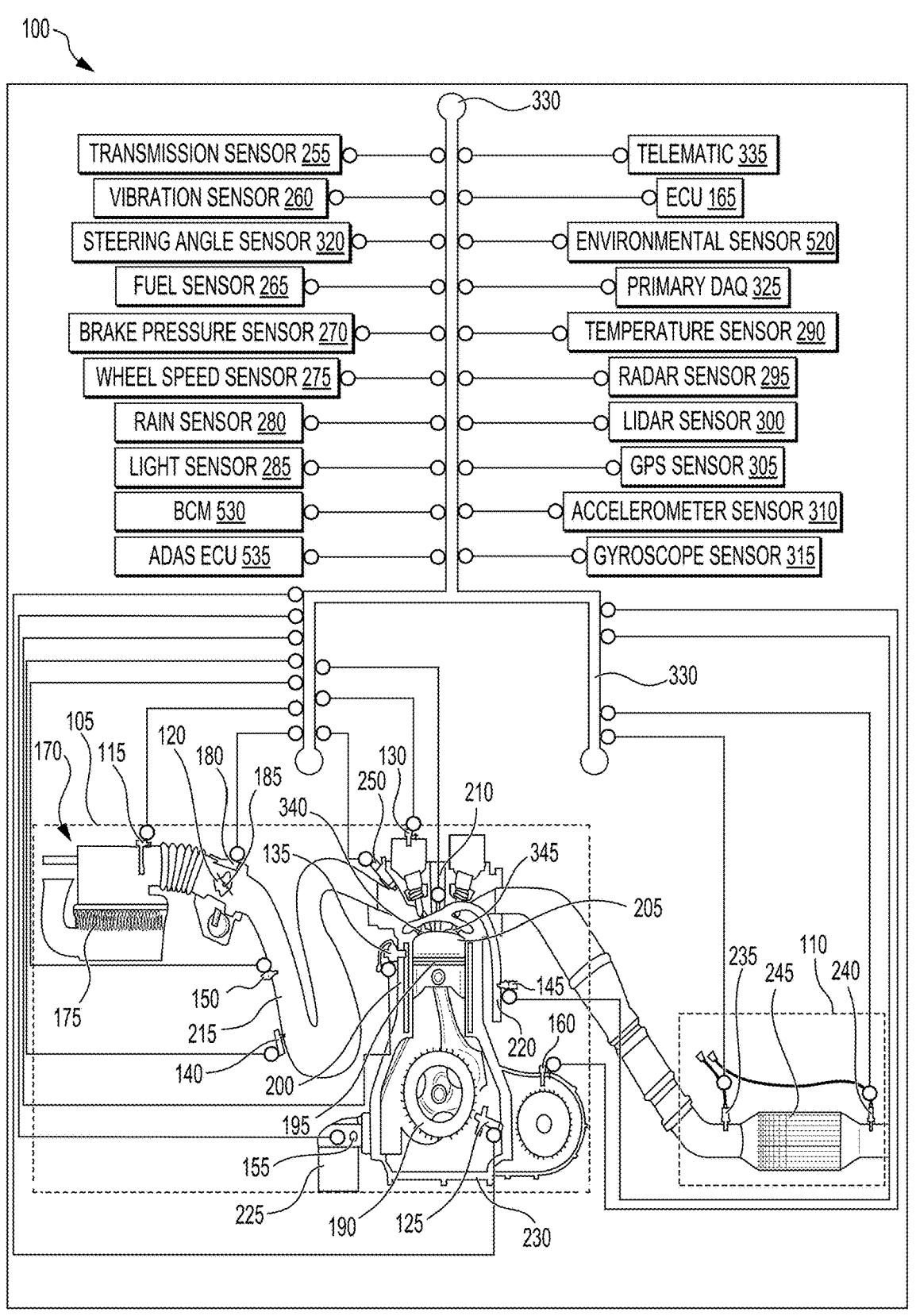
FIG. 1 depicts an overall view of the various devices and sensors within the vehicle.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Unmodified Engine

FIG. 1 depicts, in an embodiment, a vehicle 100 which can include an internal combustion engine 105 and a catalytic converter 110 attached thereto. The internal combustion engine 105 can include at least one engine sensor. The at least one engine sensor can be selected from the group consisting of a mass air flow (MAF) sensor 115, a throttle position (TPS) sensor 120, a crankshaft position (CKP) sensor 125, a camshaft position (CMP) sensor 130, a knock sensor (KS) 135, a manifold absolute pressure (MAP) sensor 140, a coolant temperature sensor (CTS) 145, an intake air temperature (IAT) sensor 150, an oil pressure sensor (OPS) 155, a vehicle speed sensor (VSS) 160, other engine sensors, and a combination thereof. The at least one engine sensor (e.g., the mass air flow (MAF) sensor 115, the throttle position (TPS) sensor 120, the crankshaft position (CKP) sensor 125, the camshaft position (CMP) sensor 130, the knock sensor (KS) 135, the manifold absolute pressure (MAP) sensor 140, the coolant temperature sensor (CTS) 145, the intake air temperature (IAT) sensor 150, the oil pressure sensor (OPS) 155, and the vehicle speed sensor (VSS) 160) can provide an electronic control unit (ECU) 165, located with the vehicle 100, with real-time data as described herein.

The MAF sensor 115 can be located in an air intake system 170, between an air filter 175 and the TPS sensor 120 as illustrated in FIG. 1. The MAF sensor 115 can measure the amount of air entering the internal combustion engine 105, which is critical for calculating the ideal fuel amount for engine combustion. The ECU 165 can use the measured air data from the MAF sensor 115 to calculate the required amount of fuel for efficient combustion thereby ensuring the correct air-fuel ratio.

As can be seen in FIG. 1, the TPS sensor 120 can be mounted on a throttle body 180. The TPS sensor 120 can monitor the position of a throttle plate 185, which controls the amount of air entering the internal combustion engine 105. In a non-limiting embodiment, the TPS sensor 120 can signify a driver's demand for power by opening the throttle plate 185 wider as an accelerator pedal (not shown) is pressed thereby allowing more air into the internal combustion engine 105. The ECU 165 can use the driver's demand for power data (i.e., throttle plate 185 position) from the TPS sensor 120 to adjust air-fuel mixture.

The CKP sensor 125, commonly known as an engine speed sensor, can be located near a crankshaft pulley (not shown) or a fly wheel 190 as indicated in FIG. 1. The CKP sensor 125 can detect the position and rotation of a crankshaft (not shown) of the internal combustion engine 105. Specifically, the CKP sensor 125 can measure the revolutions per minute (rpm) of the crankshaft. The ECU 165 can use the rpm data from the CKP sensor 125 to determine the precise timing of the internal combustion engine's 105 cycle including a top dead center (TDC) of a piston's 195 compression stroke, which is a crucial reference point for fuel injection timing.

The CMP sensor 130 can be located near a camshaft sprocket or gear (not shown). The CMP sensor 130 can detect the position and rotation of a camshaft (not shown), thereby providing the amount of work the internal combustion engine 105 is doing at a given time (i.e., engine load). In an embodiment, higher engine load can occur when the internal combustion engine 105 is working harder, such as when the vehicle 100 is accelerating or driving uphill. Conversely, lower engine load can occur when the internal combustion engine 105 is working less, such as when the vehicle 100 is cruising at a constant speed on a flat road.

In engines with variable valve timing (VVT), the CMP sensor 130 can monitor the position of the camshaft (not shown), thereby controlling the opening and the closing of the engine's intake valve 340 and the exhaust valve 345 as shown in FIG. 1. This data is essential for synchronizing fuel injections with the intake valve 340 and the exhaust valve 345 timing.

In an embodiment, the ECU 165 can use the camshaft position and rotation speed data from the CMP sensor 130 in the form of electrical pulsed signals to accurately determine and adjust the timing of spark ignition and fuel injection for each individual cylinder 205 thereby ensuring that the internal combustion engine operates with optimal efficiency and performance.

The KS 135, as displayed in FIG. 1., can be mounted on engine block 200 of the internal combustion engine 105. The KS 135 can detect the presence of or an absence of engine knocking (i.e., abnormal combustion). Specifically, the KS 135 can detect abnormal combustion within a cylinder 205 of the engine block 200. The engine knocking can occur when the fuel-air mixture ignites prematurely due to excessive heat or pressure within the cylinder 205, thereby resulting in a sharp, metallic sound. The ECU 165 can use the data from the KS 135 to adjust ignition timing of the spark plugs 210, which ignites the air-fuel mixture to optimize combustion efficiency and prevent engine knocking thereby protecting the internal combustion engine 105.

As depicted in FIG. 1, the MAP sensor 140 can be located on an intake manifold 215. The MAP sensor 140 can measure the air pressure or vacuum in the intake manifold 215 and then send this data to ECU 165. The ECU 165 can calculate, based on the received data, the ideal amount of fuel for optimal combustion and performance, ensuring the correct air-fuel mixture and igniting time for a smooth-running engine under various loads.

As shown in FIG. 1, the CTS 145 can be located in a thermostat housing 220 or screwed directly into the engine block 200. The CTS 145 can measure the temperature of the engine coolant temperature within the engine block 200 and sends the data to the ECU 165. The ECU can use this data to manage engine functions such as fuel injection and ignition timing for optimal performance and to prevent overheating.

The IAT sensor 150, as illustrated in FIG. 1, can be located in the intake manifold 215 or in the air intake system 170, near the air filter 175 or the MAF sensor 115. The IAT sensor 150 can provide the ECU 165 with the temperature of the air entering the internal combustion engine 105, which is crucial for calculating the correct air-fuel mixture for optimal performance, fuel efficiency, and emissions control. The IAT sensor 150 can provide a change in electrical resistance based on the entering air. The ECU 165 can interpret the change in electrical resistance from the IAT sensor 150 to adjust fuel injection and ignition timing.

The oil pressure sensor 155 can be located on the engine block 200, near an oil filter 225 or an oil pan 230 as seen in FIG. 1. The oil pressure sensor 155 can directly measure the oil pressure in the engine's oil passages and send the pressure information to the ECU 165 for monitoring and warning the driver of low oil pressure.

As indicated in FIG. 1, the VSS 160 can be near the engine block 200. The VSS 160 can send a signal to the ECU 165 to let it know the vehicle's 100 speed. Based on the received signal, the ECU 165 can regulate the transmission, the speedometer, and/or other engine management tasks.

The catalytic converter 110 can include at least one oxygen sensor as displayed in FIG. 1. Specifically, the at least one oxygen sensor can include a first oxygen sensor 235 and a second oxygen sensor 240 with a catalytic converter body 245 located therebetween. The at least one oxygen sensor can measure the amount of oxygen in the exhaust gases within the catalytic converter 110 after combustion. The ECU 165 can use the measured data to fine-tune the air-fuel mixture and optimize fuel injection timing for providing efficient combustion, improved fuel efficiency, and emissions reduction (e.g., reduction in carbon monoxide, hydrocarbons, nitrogen oxides, and/or particulate matters). In a non-limiting embodiment, if the at least one oxygen sensor detects excess oxygen (i.e., lean mixture), the at least one oxygen sensor can send a signal to the ECU 165 to increase fuel delivery to the cylinder 205 via a fuel injector 250 as depicted in FIG. 1. It should be noted that the internal combustion engine 105, in a non-limiting embodiment, can have more than one fuel injector 250, intake valve 340, and/or exhaust valve 345. Conversely, in another non-limiting embodiment, if the at least one oxygen sensor detects insufficient oxygen (i.e., rich mixture), the at least one oxygen sensor can send a signal to the ECU 165 to decrease fuel delivery to the cylinder 205 via the fuel injector 250.

In an embodiment, the amount of exhaust gas recirculated (EGR) back into the intake manifold 215 can be adjusted to reduce nitrogen oxide omissions.

The vehicle 100 can further include at least one vehicle auxiliary sensor as shown in FIG. 1. The at least one vehicle auxiliary sensor can be selected from the group consisting of a transmission sensor 255, a vibration sensor 260, a fuel sensor 265, a brake pressure sensor 270, a wheel speed sensor 275, an environmental sensor 520, a rain sensor 280, a light sensor 285, a temperature sensor 290, a radar sensor 295, a lidar sensor 300, a GPS sensor 305, an accelerometer sensor 310, a gyroscope sensor 315, a steering angle sensor 320, other auxiliary sensors, and a combination thereof.

The transmission sensor 225, which can include two or more transmission sensors 225, can be located on the inside or outside of a transmission (not shown). The transmission sensor(s) 225 can monitor the transmission gear's (not shown) position, speed, and/or torque. The transmission sensor(s) 225 can provide the ECU 165 with vehicle speed and fluid temperature, enabling the ECU 165 to manage gear shifts, optimize performance, and ensure smooth vehicle operation. The ECU 165 can use the vehicle speed and fluid temperature to adjust fuel injection, ignition timing, and transmission shifting for efficiency and a better driving experience.

The vibration sensor 260, also known as a mechanical sensor, can be configured to sense excessive vibration from the internal combustion engine 105 due to an imbalance or misfiring. Misfiring refers to the failure of the combustion cycle in the cylinder 205 thereby causing vibration which is a form of imbalance in the engine's operation.

In an embodiment, the vibration sensor 260, which is located on the motor block, can convert the excessive vibration into an electrical signal which can be sent to the ECU 165.

The fuel sensor 265 can include two or more fuel sensors 265. The fuel sensor(s) 265 can measure pressure, flow rate, and temperature of the fuel. The fuel sensor(s) 265 can also monitor the quality of the fuel. The fuel sensor(s) 265 can provide further insights for AI optimization.

The brake pressure sensor 270 can measure the pressure applied to the brakes (not shown). The brake pressure sensor 270 can communicate with an anti-lock braking system (ABS) (not shown) and an electronic stability program (ESP) control unit (not shown) via voltage signals data. The ECU 165 can use the voltage signals data from the ABS and the ESP control unit to activate safety systems such as brake assist (not shown) and electronic stability control system (not shown).

The wheel speed sensor 275 can include two or more wheel speed sensors 275. Each wheel speed sensor 275 can be located on each wheel hub (not shown) of the vehicle 100. The wheel speed sensor(s) 275 can measure the rotational speed of each wheel of the vehicle 100. The wheel speed sensor(s) 275 can communicate with the ABS and the ESP control unit via voltage signals data to measure individual rotation of each of the wheel. The ECU 165 can use the voltage signals data to activate safety systems such as the ABS, the ESP control unit, and a traction control system (TCS).

The environmental sensor 520 can be located in the interior and/or exterior of the vehicle 100. The environmental sensor 520 can measure temperature, humidity, air quality, wind speed, and presence of obstacles in the surroundings of the vehicle 100.

The rain sensor 280 can be located on the windshield (not shown) of the vehicle 100. The rain sensor 280 can be configured to detect rain or moisture on the windshield. In a non-limiting embodiment, the rain sensor 280 can communicate with a body control module (BCM) 530 via digital signals data. The BCM 530 can use the digital signals data to automatically activate and adjust the speed of the windshield wipers (not shown). In an embodiment, the BCM 530 can communicate with the ECU 165.

The light sensor 285 can be configured to measure ambient light levels. The light sensors 285 can be located on a dashboard (not shown) or near a rearview mirror (not shown).

In a non-limiting embodiment, the temperature sensor 290 can be located on an exterior of the vehicle 100. The temperature sensor 290 can be configured to measure the outside (i.e., surrounding environment) temperature.

In another non-limiting embodiment, the temperature sensor 290 can be an engine coolant sensor (ECT) or an inlet air temperature sensor (IAT). In this regard, the temperature sensor 290 can communicate with the ECU 165 via a variable voltage signal (variable resistance). The ECU 165 can use the variable voltage signal to regulate ignition timing and fuel/air ratio to improve combustion efficiency.

The radar sensor 295 can be located within the vehicle 100. The radar sensor 295 is a type of radio-based sensor that can detect objects and measure their distance and/or speed with respect to the vehicle 100. The radar sensor 295 can communicate with advanced driver assistance control units (ADAS ECU) 535 via the CAN bus 330. The ECU 165 can use the data from the radar sensor 295 via the CAN bus 330 to operate safety systems such as an adaptive cruise control (ACC) (not shown) and an automatic emergency braking (AEB) (not shown).

The lidar sensor 300 can be located within the vehicle 100. The lidar sensor 300 is a type of laser-based sensor that can measure distance by emitting laser pulses to accurately measure the location and shape of surrounding objects in three dimensions (3D). The lidar sensor 300 can communicate with an autonomous driving controller (not shown) within the ADAS ECU 535 via a high-speed data bus such as the Can bus 330. The ECU 165 can use the data from the autonomous driving controller within the ADAS ECU 535 to create a point cloud map used in navigation and route planning systems.

The GPS sensor 305 can be located within the vehicle 100. The GPS sensor 305 is a satellite-based navigation system that can determine location of the vehicle 100. The GPS sensor 305 can communicate with a remote communication unit (TCU) (not shown) or an infotainment unit (Infotainment ECU) (not shown) via the CAN bus 330. The ECU 165 can communicate with the TCU and/or Infotainment ECU via the CAN bus 330. The ECU 165 can use data from the TCU and/or Infotainment ECU to provide navigation services, accurately determine vehicle speed (as a secondary factor), and determine the vehicle 100 location in automatic distress (eCall) situations.

The accelerometer sensor 310 can include two or more accelerometer sensors 310. The accelerometer sensor(s) 310 can measure acceleration. The accelerometer sensor(s) 310 can be located within and communicate with a stability control unit (ESP/ESC ECU) (not shown) via an internal data bus such as the CAN bus 330. The ECU 165 can communicate with the ESP/ESC ECU via the CAN bus 330. The ECU 165 can use data from the ESP/ESC ECU to detect deviations and collisions to active systems such as stability control (not shown) and airbags (not shown).

The gyroscope sensor 315 can measure the yaw rate, which is the angular velocity of the vehicle's 100 rotation around its vertical axis. The gyroscope sensor 315 can be located inside of and communicate with the ESP/ESC ECU. The ECU 165 can communicate with the ESP/ESC ECU via the CAN bus 330. The ECU 165 can use the data from the ESP/ESC ECU to compare the driver's intention with the vehicle's 100 actual movement and activate the electronic stability control system.

The steering wheel angle sensor (SAS) 320 can be located near the steering wheel (not shown). The SAS 320 can measure the angle of the steering wheel. The SAS 320 can communicate with the ESP/ESC ECU via the CAN bus 330. The ECU 165 can use the data from the ESP/ESC ECU to determine the driver's intention and compare it to actual movement to activate the electronic stability control system and an adaptive braking system.

Figure 4:
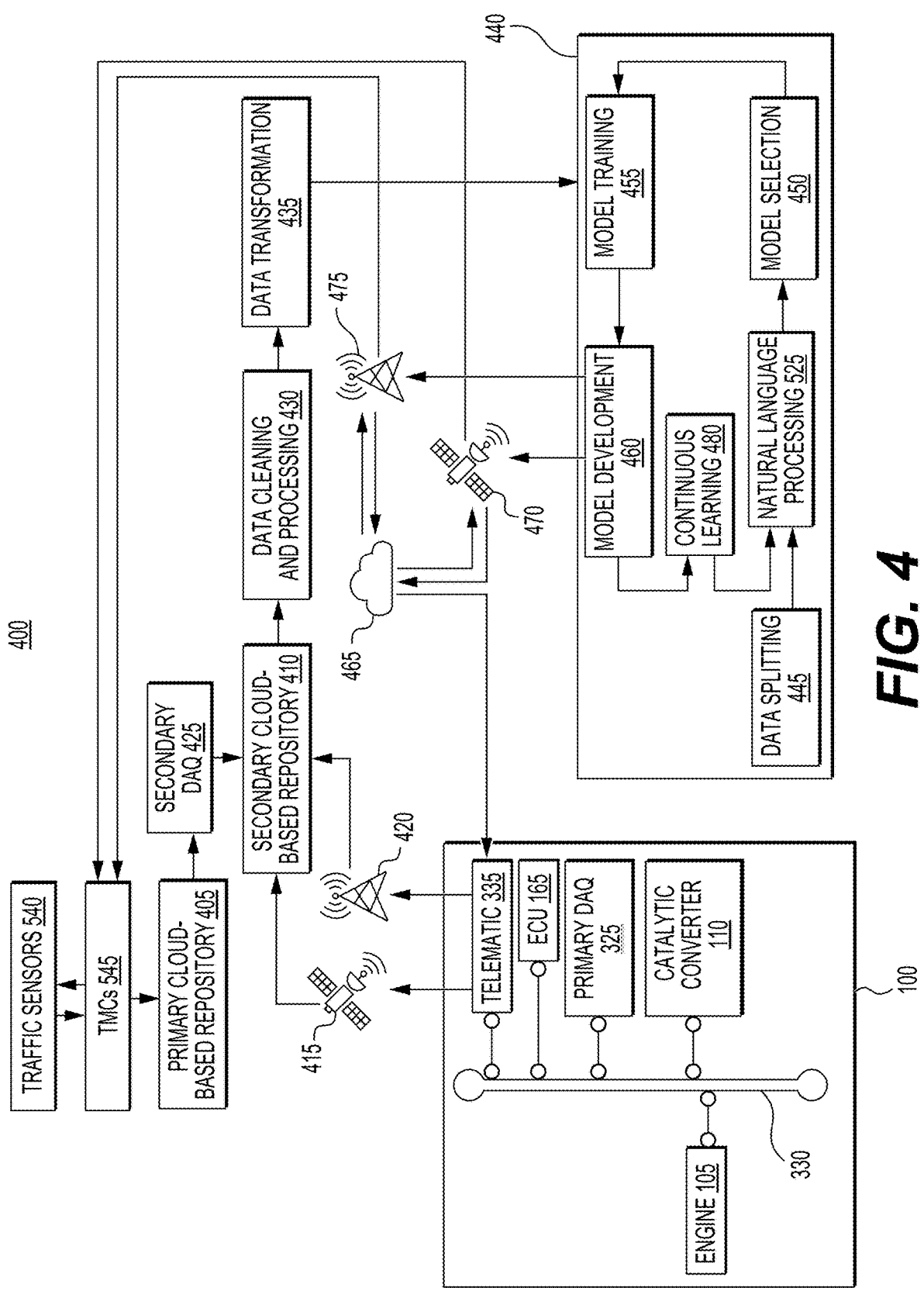
FIG. 4 depicts an overall flow diagram of the system.

In an embodiment, traffic sensors 540 (e.g., cameras, radars, and inductive loops on the road), which are separate from and external to the vehicle 100, can be used to detect vehicles and their properties to manage traffic flow, improve safety, and collect data. The traffic sensors 540 can send data (via network of wireless and wired connections) to central traffic management systems and intelligent navigation services, which are located in dedicated traffic management centers TMCs 545 operated by local, state, federal government agencies, and private sectors. The data from the central traffic management systems and intelligent navigation services can be in communication with a primary cloud-based data repository 405 (via extravehicular communication (V2X) sources) as shown in FIG. 4 and described herein.

In an embodiment, at least one signal of the at least one engine sensor (e.g., the MAF sensor 115, the TPS sensor 120, the CKP sensor 125, the CMP sensor 130, the KS 135, the MAP sensor 140, the CTS 145, the IAT sensor 150, the OPS 155, and/or the VSS 160), at least one signal of the at least one oxygen sensor (e.g., the first oxygen sensor 235 and/or the second oxygen sensor 240), and/or at least one signal of the at least one vehicle auxiliary sensor (e.g., the transmission sensor 255, the vibration sensor 260, the fuel sensor 265, the brake pressure sensor 270, the wheel speed sensor(s) 275, the rain sensor 280, the light sensor 285, the temperature sensor 290, the radar sensor 295, the lidar sensor 300, the GPS sensor 305, the accelerometer sensor 310, the gyroscope sensor 315, and/or the steering angle sensor 320) can be received by and be in communication with a primary data acquisition (DAQ) unit 325 via a controller area network (CAN) bus 330. The primary DAQ unit 325 can perform signal conditioning (e.g., amplification and filtering) of the at least one signal of the at least one engine sensor, the at least one signal of the at least one oxygen sensor, and the at least one signal of the at least one vehicle auxiliary sensor to improve data quality.

In an embodiment, the primary DAQ unit 325 can be in communication with the ECU 165 via the CAN bus 330. In this regard, the conditioned signals of the at least one signal of the at least one engine sensor, the at least one signal of the at least one oxygen sensor, and the at least one signal of the at least one vehicle auxiliary sensor from the DAQ unit 325 can be transmitted to the ECU 165 via the CAN bus 330. The ECU 165 can generate at least one engine data (for the at least one engine sensor), at least one oxygen amount data (for the at least one oxygen sensor), and at least one vehicle auxiliary data (for the at least one vehicle auxiliary sensor) based on the transmitted conditioned signals received by the ECU 165. The ECU 165 can continuously record various engine parameters and operating conditions. This historical data can be accessed and analyzed to identify trends and patterns. The ECU 165 can also generate diagnostic trouble codes (DTCs) based on detection(s) of at least one fault by at least one of the sensor(s) (all of the sensors as described herein are capable of providing fault signals) as described supra, which are indicative of specific problems or malfunctions within the internal combustion engine 105.

Figure 2:
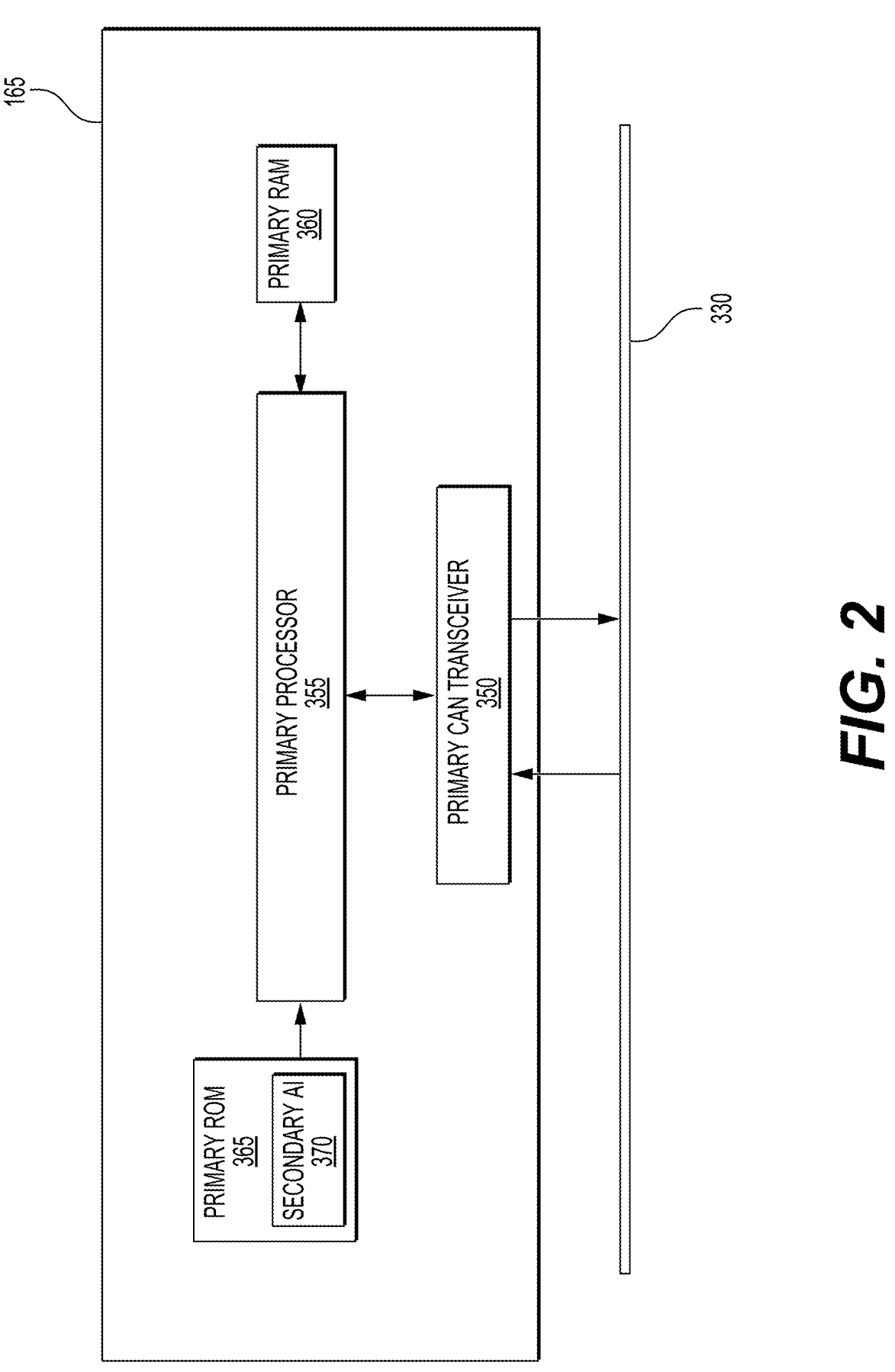
FIG. 2 depicts a flow diagram of the electronic control unit (ECU).

In an embodiment, the ECU 165 can include a primary CAN transceiver 350, a primary processor 355, a primary read-write memory (RAM) 360, and a primary read-only memory (ROM) 365 as shown in FIG. 2. The primary ROM 365 can include a secondary artificial intelligence unit 370 as illustrated in FIG. 2. The secondary artificial intelligence unit 370 can be used for specialized tasks such as image processing and/or as a backup security unit (redundant monitor) to verify the integrity of critical decisions made by the AI 440 (i.e., ensuring that the AI 440 outputs are accurate, reliable, and consistent) as shown in FIG. 4 and described herein.

In an embodiment, the ECU 165 can be in communication with a telematic control unit (TCU) 335 via the CAN bus 330. In this context, the TCU 335 can be configured to receive the at least one engine data, the at least one oxygen amount data, and the at least one vehicle auxiliary data from the ECU 165 via the CAN bus 330. In a further non-limiting embodiment, the TCU 335 can collect data on driving behavior (via the accelerometer sensor(s) 310, gyroscope sensor 315, SAS 320, and wheel speed sensor(s) 275), fuel consumption (via the ECT, IAT, wheel speed sensor(s) 275, and GPS sensor 305), and/or vehicle location (via the GPS sensor 305) thereby providing valuable insights into realworld driving conditions. In particular, the TCU 335 can collect data on driving behavior (e.g., acceleration, braking (via the brake pressure sensor 270), and cornering) which can influence the internal combustion engine 105 wear and tear.

Figure 3:
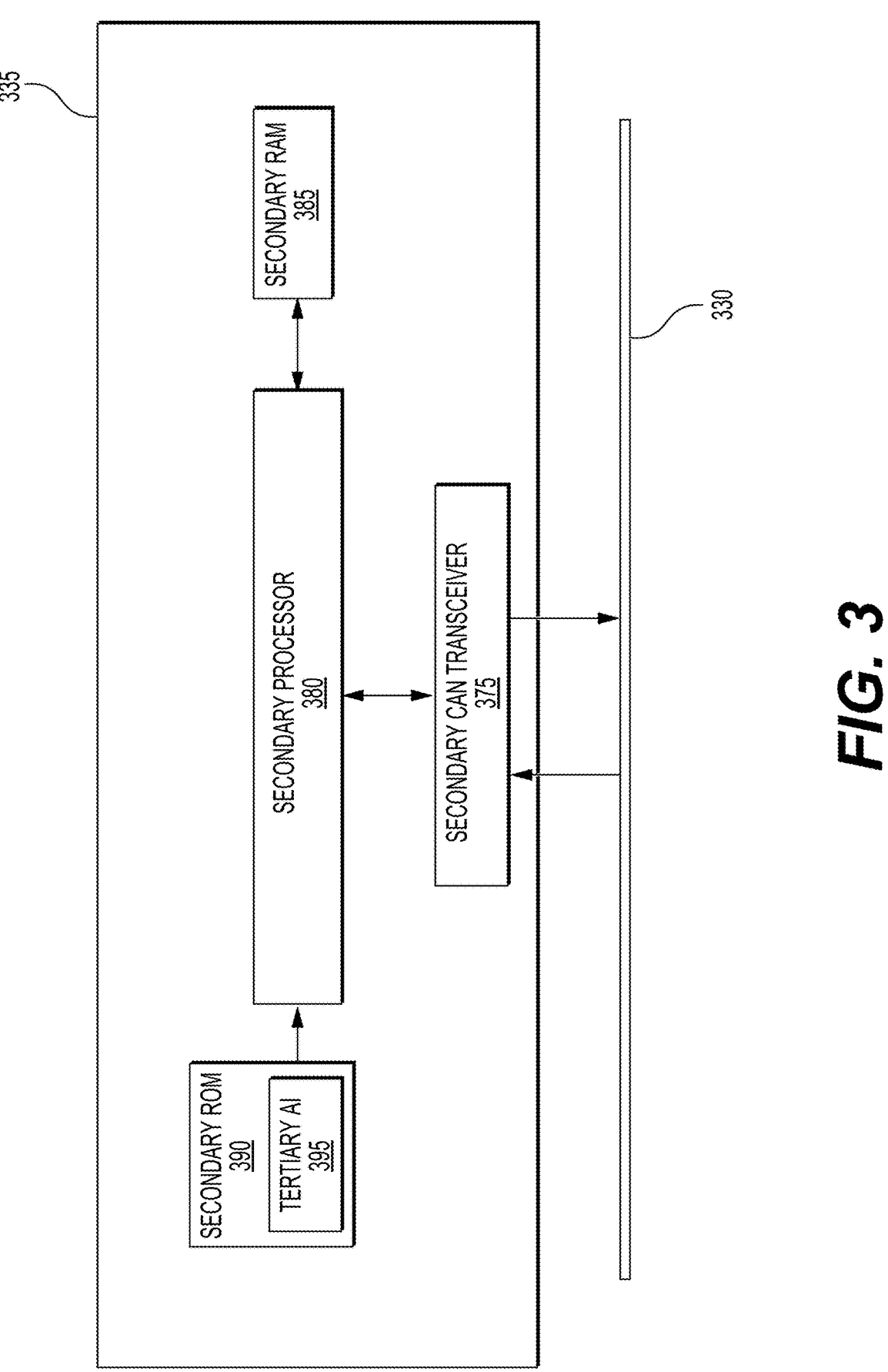
FIG. 3 depicts a flow diagram of the telematic control unit (TCU).

In an embodiment, the TCU 335 can include a secondary CAN transceiver 375, a secondary processor 380, a secondary read-write memory (RAM) 385, and a secondary read-only memory (ROM) 390 as shown in FIG. 3. The primary ROM 390 can include a tertiary artificial intelligence unit 395 as illustrated in FIG. 3. The tertiary artificial intelligence unit 395 can be used for processing non-critical and/or long-term data such as improving the user interface, analyzing behavior, and/or supporting predictive map updates.

FIG. 4 depicts an overall system 400 which can include the vehicle 100. As described supra, the vehicle 100 can include the internal combustion engine 105, the catalytic converter 110, the DAQ unit 325, the ECU 165, the TCU 335, and the CAN bus 330. While the vehicle 100 as shown in FIG. 3 has some of the mentioned parts that are similar to the vehicle 100 as shown in FIG. 1, it should be understood that the vehicle 100 as shown in FIG. 3 can have all the parts of the vehicle 100 and function the same as shown in FIG. 1 without departing from the present subject matter.

In an embodiment, the system 400 can also include a primary cloud-based data repository 405 and a secondary cloud-based data repository 410. The primary cloud-based data repository 405 and the secondary cloud-based data repository 410 can be dedicated databases, data lakes, or cloud storage services such as Amazon S3 or Google Cloud Storage.

The TCU 335 can be configured to transmit the at least one engine data, the at least one oxygen amount data, and the at least one vehicle auxiliary data to the secondary cloud-based data repository 410 via a primary satellite 415 or a primary cellular tower 420.

The primary cloud-based data repository 405 can be configured to continuously store at least one of maintenance records data of the vehicle 100, weather data, traffic data. The traffic data can include the traffic sensors data from the central traffic management systems and the intelligent navigation services as described supra. In an embodiment, the maintenance records data can include service history of the vehicle 100, maintenance schedules, repairs, part replacements, and the like. The maintenance records data can provide valuable information about engine wear and tear. In an embodiment, the primary cloud-based data repository 405 can be in communication (via satellite or cellular tower) (not shown) with an external database and/or a fleet management system to provide the maintenance records data. The weather data can include historical weather data (e.g., temperature, humidity, etc.) which can be integrated to account for environmental influences on engine performance. The traffic data can include real-time and historical traffic data. The traffic data can be used to analyze driving patterns and optimize engine control strategies. In an embodiment, the primary cloud-based data repository 405 can also be in communication with the internet (via fiber optic cables with data centers) and/or extravehicular communication (V2X) sources (via cellular networks or dedicated short-range communications) to provide the weather data and the traffic data.

In an embodiment, the system 400 can additionally include a secondary data acquisition (DAQ) unit 425 that can be in communication with the primary cloud-based data repository 405. The secondary DAQ unit 425 can be configured to receive and perform signal conditioning of (e.g., amplification and filtering) of the at least one of maintenance records data of the vehicle 100, weather data, and traffic data to improve data quality.

The secondary DAQ unit 425 can be in communication with the secondary cloud-based data repository 410. In this aspect, the conditioned signals of the at least one of maintenance records data of the vehicle 100, weather data, and traffic data from the secondary DAQ unit 425 can be transmitted to the secondary cloud-based data repository 410 as shown in FIG. 4.

In an embodiment, the at least one engine data, the at least one oxygen amount data, and the at least one vehicle auxiliary data and the conditioned signals of the at least one of maintenance records data of the vehicle 100, weather data, and traffic data from the secondary cloud-based data repository 410 may contain errors, inconsistencies, or missing values. To improve data quality, the at least one engine data, the at least one oxygen amount data, and the at least one vehicle auxiliary data and the conditioned signals of the at least one of maintenance records data of the vehicle 100, weather data, and traffic data from the secondary cloud-based data repository 410 can be transmitted to the data cleaning (e.g., imputation and outlier detection) and processing module 430 to be cleaned and processed.

The cleaned and processed at least one engine data, at least one oxygen amount data, at least one vehicle auxiliary data, at least one of maintenance records data of the vehicle 100, weather data, and traffic data can be transmitted to a data transformation module 435 for transforming all the data into a suitable format for AI processing in the primary artificial intelligence module 440. According to this embodiment, feature engineering and data normalization can be applied to all of the cleaned and processed data.

During feature engineering, relevant features of all of the cleaned and processed data can be extracted to enhance the AI model's performance as described herein. In a non-limiting example, the relevant features extraction can involve creating new variables (e.g., engine load, air-fuel ratio, etc.) or transforming existing ones.

After feature engineering, the relevant features extracted data can be normalized by scaling or transforming the data to a common range during the data normalization step.

The system 400 can further include the primary artificial intelligence module 440 which can be in communication with the data transformation module 435 as shown in FIG. 4. The primary artificial intelligence module 440, which can be stored within a primary cloud server, can be configured to receive all of the transformed data (i.e., at least one engine data, at least one oxygen amount data, at least one vehicle auxiliary data, at least one of maintenance records data of the vehicle 100, weather data, and traffic data) from the data transformation module 435. The primary artificial intelligence module 440 can be used for sensory fusion and critical path planning tasks.

Within the primary artificial intelligence module 440, all of the transformed data can be initially split via a data splitting module 445. Corresponding to this embodiment, all of the transformed data can be split into training, validation, and test sets to evaluate the AI model's performance and prevent overfitting.

Then, the split data from the data splitting module 445 can be transmitted to and processed by a natural language processing module 525. In an embodiment, the natural language processing module 525 can allow the AI model during a model selection step, as described herein, to understand and generate human language from the split data.

Next, all of the data from the natural language processing module 525 can be transmitted to a model selection module 450. Within the model selection module 450, AI models can be selected based on the specific application desired (e.g., predictive maintenance, performance optimization, etc.). The AI models can be selected from the group consisting of time series models, data annotation, machine learning models, deep learning models, fuzzy logic, Bayesian networks, other AI models, and a combination thereof. In an embodiment, each of the mentioned AI models can communicate with each other to provide a more comprehensive and accurate analysis of the sensor(s) data. In a non-limiting embodiment, the time series, machine learning models, and fuzzy logic can interpret and analyze the data of the electrical pulsed signals from the CMP sensor 130 to identify any deviations in engine timing. Based on the interpretation and the analysis, the time series, machine learning models, and fuzzy logic can predict faults (e.g., predictive maintenance) and/or adjust the variable valve timing (VVT) system to continuously improve performance and efficiency.

Time series models, which can include ARIMA and LSTM, can be used for predicting future engine behavior.

During data annotation, the data can be labelled or annotated to provide the AI with ground truth information (i.e., correct engine settings for a given situation). In this regard and as a non-limiting example, the ground truth information can include when driving at high speed and full load whereby the machine learning models can use the data of the electrical pulsed signals from the CMP sensor 130 to determine the optimal variable valve timing (VVT) angle setting thereby directing the internal combustion engine 105 to delay valve timing for maximum horsepower.

Machine learning models can be used for identifying patterns and relationships in engine data. Machine learning models can include one or more of Random forest models (Random Forest), Support Vector Machines, reinforcement learning, supervised learning, and unsupervised learning. In this regard, Random Forest are used to classify the state of a camshaft sensor (CMP) or predict the optimal angle for valve timing, while supporting vector machines (Support Vector Machines) are used to accurately distinguish between different fault patterns based on CMP data.

Random Forest can classify the state of the CMP sensor 130 and/or predict the optimal angle for the variable valve timing.

Support Vector Machines can accurately distinguish between different fault patterns based on the data of the electrical pulsed signals from the CMP sensor 130.

Reinforcement learning can learn data through trial and error, which includes rewards for positive outcomes and penalties for negative outcomes. During reinforcement learning, parameters can be adjusted, and results are observed. By rewarding successful adjustments (e.g., improved fuel efficiency, reduced emissions) and punishing unsuccessful adjustments (e.g., decreased fuel efficiency, increased emissions), the AI model can gradually refine its control strategies.

In supervised learning, the AI can be trained on labeled data where the correct output can be provided for each data input.

In unsupervised learning, the AI can learn patterns and relationships within the data without explicit labels.

Deep learning models can be used for complex pattern recognition and anomaly detection. Specifically, deep learning models can analyze complex patterns in data and make predictions. Deep learning models can include convolutional neural networks and recurrent neural networks.

Fuzzy logic can be used reasoning which can handle uncertainty and imprecision in data.

Bayesian networks can be used for retrieving and combining new data of the electrical pulsed signals from the CMP sensor 130 with historical probabilities of malfunctions of the CMP sensor 130 to generate a combined data. The combined data can be used for updating the Bayesian networks confidence level in diagnosing a particular malfunction such as timing chain wear.

After the model selection module 450, the data can be trained in a model training module 455. In the model training module 455, the selected AI model(s) from the model selection module 450 can be used to train on the training data thereby learning to identify patterns, correlations, and anomalies in engine behavior. Specifically, the historical data can be used to train AI algorithms (e.g., machine learning and deep learning models). The AI model(s) learn patterns, correlations, and anomalies in engine behavior. The AI algorithms used in engine control systems can be constantly refined to improve their ability to optimize combustion. The AI can use machine learning algorithms to identify patterns and trends in the sensor data, which can help detect anomalies or predict potential problems.

Thereafter, the trained data from the model training module 455 can be transferred to a model deployment module 460 for deploying to a suitable environment such as a secondary cloud server 465 via a secondary satellite 470 or a secondary cellular tower 475. Subsequently, the trained data from the secondary cloud server 465 can be transferred to the TCU 335 via the secondary satellite 470 or the secondary cellular tower 475. Following, the trained data from the TCU 335 can be transferred to the ECU 165 via the CAN bus 330 for adjusting at least one engine parameter.

Referring back to FIG. 4, after the model deployment module 460, the trained model can be recycled back into the natural language processing module 525 via a continuous learning module 480. In an embodiment, the continuous learning module 480 can include online learning, transfer learning, and self-learning capabilities.

In online learning, the AI model(s) can continuously learn from new data collected during vehicle operation. This allows the system to adapt to changing driving conditions, vehicle wear and tear, and environmental factors. AI models in online learning can continue to learn and adapt as they collect new data thereby allowing them to improve their performance over time.

In transfer learning, AI model(s) can transfer knowledge learned from one task to another thereby accelerating the learning process.

In self-learning capabilities, the AI model(s) can learn and adapt to different driving styles, fuel types, and environmental conditions. This can further optimize engine performance and efficiency over time.

Performance Optimization

The performance optimization as described supra can include performance degradation wherein the AI from the primary artificial intelligence module 440 (hereinafter, the AI from the primary artificial intelligence module 440 will be referred as "AI 440") can detect a large or gradual decline in engine performance (e.g., reduced fuel efficiency or increased emissions) and identify potential causes. The gradual performance degradation can be a consistent decrease in fuel efficiency or an increase in emissions over time which can indicate issues such as wear and tear of engine components, fuel system problems, and/or sensor malfunctions. Additionally, performance degradation can also include a noticeable decrease in fuel economy compared to historical averages for the same driving conditions. Through performance optimization, the AI model from AI 440 can provide recommendations for adjusting engine parameters (e.g., fuel injection timing or ignition timing) to improve fuel efficiency and reduce emission.

As a non-limiting example of the fuel injection timing, the AI 440 can analyze data from the CKP sensor 125, TPS sensor 120, MAP sensor 140, oxygen sensors (first oxygen sensor 235 and second oxygen sensor 240) to determine the ideal injection timing. The AI 440 can use the analyzed data and adjust the timing of the fuel injectors 250 to ensure that fuel is injected into each of the cylinder 205 (combustion chamber) at the optimal time for efficient combustion thereby improving fuel efficiency and reducing emissions.

As another non-limiting example of the ignition timing, the AI 440 can analyze the data from the CKP sensor 125, KS 135, oxygen sensors (first oxygen sensor 235 and second oxygen sensor 240) to determine the ignition timing. The AI 440 can use the analyzed data and adjust the timing of the spark plugs 210 to prevent pre-ignition or detonation thereby ensuring the spark plugs 210 fires at the optimal time for efficient combustion thereby maximizing power output while minimizing knocking and emissions.

As a further non-limiting example of the air-fuel ratio, the AI 440 can analyze data from the oxygen sensors (first oxygen sensor 235 and second oxygen sensor 240), MAP sensor 140, and CKP sensor 125 to determine the air-fuel ratio. The AI 440 can use the analyzed data and adjust the amount of fuel injected or the amount of air entering the engine block 200 to achieve optimal combustion thereby minimizing fuel consumption and emissions.

In certain non-limiting embodiments, adjustment of the gear shifts (not shown) of the vehicle 100 can be optimized for fuel efficiency and performance.

In a particular non-limiting embodiment, the temperature and airflow of the climate control system (not shown) can be adjusted based on the driver's preferences and external conditions.

In some non-limiting embodiments, the AI 440 can analyze data from the radar sensor 295 and/or the lidar sensor 300 to determine a safe following distance. The AI 440 can use the analyzed data and adjust the following distance via an adaptive cruise control (not shown) to maintain a safe following distance from the vehicle ahead. In an embodiment, the AI 440 can analyze complex data from the radar sensor 295, the lidar sensor 300, and/or a camera sensor (not shown) to accurately classify objects (i.e., distinguish cars from pedestrians) and predict the objects path in autonomous driving systems.

In an embodiment, the AI 440 can integrate, analyze, and classify the massive point cloud map, as described above, in real time to make autonomous driving decisions.

In a non-limiting embodiment, the AI 440 can analyze data from the camera sensor and the SAS 320 to determine centering of the vehicle 100 within its lane. The AI 440 can use the analyzed data and adjust the centering of the vehicle 100 within its lane via a lane keeping assist (not shown).

In an embodiment, the AI 440 can analyze the steering pattern via data from the SAS 320 to identify driver fatigue and assist in lane planning for autonomous vehicles.

In another non-limiting embodiment, the AI 440 can analyze data from the radar sensor 295 and/or the lidar sensor 300 to detect potential collisions. The AI 440 can use the analyzed data and initiate braking of the vehicle 100 to prevent collisions.

In a further non-limiting embodiment, the AI 440 can analyze data from the GPS sensor 305, map sensor 140, and/or traffic sensors 540 to determine the most efficient route. The AI 440 can use the analyzed data to plan the most efficient route and provide real-time traffic updates.

In an embodiment, the AI 440 can analyze the traffic data to predict traffic congestion and indirectly improve the flow of traffic signals to serve vehicles. The prediction can be sent (via the secondary satellite 470 or the secondary cellular tower 475) from the model development 460 to the central traffic management systems and intelligent navigation services within the TMCs 545. Afterwards, the traffic sensors 540 can receive the prediction from the central traffic management systems and intelligent navigation services to better manage or regulate traffic flow and enhance improvement in traffic safety.

In an embodiment, the AI 440 can use the data from the TCU and/or Infotainment ECU via the ECU 165 to improve positioning accuracy of the vehicle 100, improve lane guidance in autonomous driving systems, and support functions such as fuel-efficient predictive driving.

Anomalies

In certain non-limiting embodiments, the anomalies as discussed supra can include the AI 440 identifying unusual or unexpected engine behavior, which indicates potential problems that require further investigation. The anomalies can include malfunctions in the sensor(s). The malfunctions in the sensor(s) can include sensor anomalies, sudden changes, drifting values, and inconsistent readings.

Sensor anomalies can be sudden or unexpected changes in sensor readings, such as spikes or drop in values.

Sudden changes in the sensor can be unexpected spikes or drops in sensor readings, such as a sudden increase in engine temperature or a drop in oil pressure.

Drifting values can be gradual changes in sensor readings over time, indicating potential sensor degradation or calibration issues.

Inconsistent readings can be fluctuations in sensor reading that are not consistent with expected engine behavior.

In a particular non-limiting embodiment, the AI 440 can detect abnormal combustion patterns (e.g., engine knocking via the KS 135) which can be caused by issues such as ignition timing problems, fuel quality issues, or carbon buildup.

In some non-limiting embodiments, the AI 440 can analyze data from the CKP sensor 125 and other sensors (e.g., vibration sensor 260) to determine misfiring of the spark plugs 210. The AI 440 can use the analyzed data and control the firing of the spark plugs 210. In a non-limiting embodiment, the neural networks (i.e., convolutional neural networks and/or recurrent neural networks) of the AI 440 can be used to analyze the data from the vibration sensor 260 to distinguish with high accuracy between a background noise and the characteristic signature of a crackle or a misfire to identify the affected cylinder 205.

As a non-limiting example, excessive or unusual engine vibrations, which can indicate problems such as engine imbalance, worn engine mounts, or issues with the drivetrain, can be detected by the AI 440 based on the received vehicle data.

Figure 6:
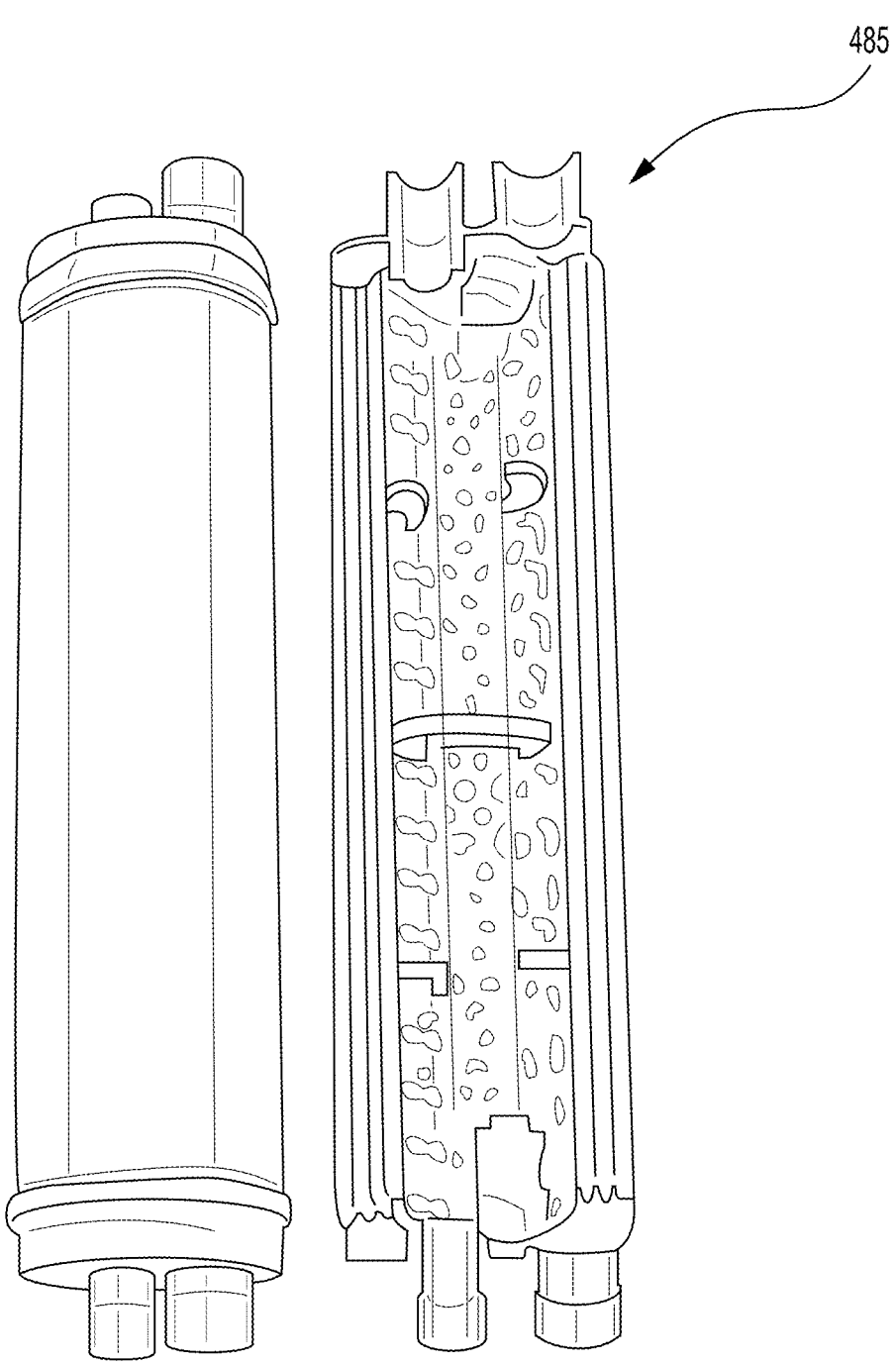
FIG. 6 depicts a fuel rail heater.

As another non-limiting example, the AI 440 can identify issues such as clogged fuel injectors or low fuel pressure (via reading from the fuel sensor 265, fuel temperature sensor, CKP sensor 125, CMP sensor 130) and control the fuel preheaters (e.g., the fuel rail heater 485 as shown in FIG. 6 and described herein), timing of fuel injection, and quantity of fuel injection to compensate for the high viscosity of the frying oil used as described herein thereby ensuring efficient combustion and avoiding fuel injectors clogging.

As a non-limiting example, the AI 440 can detect variations in fuel quality (via reading from the fuel sensor 265) that could affect engine performance and emissions.

In a further non-limiting example, the AI 440 can detect new diagnostic trouble codes (DTCs), repeated occurrences of the same DTCs (indicating an unresolved issue), or occurrence of multiple DTCs simultaneously (indicating more complex issue).

Personalized Driving Experience

The AI 440 can identify common driving patterns (e.g., frequent hard acceleration, excessive idling, excessive braking) and their impact on fuel consumption and emissions. This information can be used to provide personalized driving tips and improve driver behavior. Frequent hard accelerations or excessive breaking can stress the engine and increase the risk of wear and tear.

The data can be used to provide personalized driving tips and improved driver behavior. Frequent hard accelerations or excessive braking can stress the engine and increase the risk of wear and tear. The AI 440 can learn a driver's driving style including acceleration (via reading from the accelerometer sensors 310), braking (via reading from the brake pressure sensor 270), and steering patterns (via readings from the TPS sensor 120, VSS 160, brake pressure sensor 270, wheel speed sensor(s) 275, radar sensor 295, lidar sensor 300, accelerometer sensor 310, gyroscope sensor 315, and/or environmental sensor 520). The AI 440 can use the learned driving style to improve fuel performance and efficiency by adjusting the timing of transmission shifts and/or adapting the sensitivity of ADAS. The AI 440 can also use the learned driving style to enhance safety by monitoring driver's behaviors to detect fatigue or distraction.

In an embodiment, the AI 440 can be used to analyze acceleration data from the accelerometer sensor 310 via the ECU 165 to predict if the vehicle 100 will rollover, including optionally based on road conditions. The AI 440 can determine severity of a vehicle collision with extreme accuracy based on the acceleration data.

In an embodiment, the AI 440 can be used to improve the dynamic stability of the vehicle 100 by combing gyroscope data from the gyroscope sensor 315 with other sensor data (e.g., data from the accelerometer sensor 310, steering angle sensor 320, and wheel speed sensor(s) 275) to accurately estimate vehicle motion.

In a non-limiting embodiment, the machine learning models of the AI 440 can be used to analyze brake pressure patterns from the brake pressure sensor 270 thereby allowing the AI 440 to predict the intention of the driver (e.g., normal braking or emergency braking) which can result in improving the response of the active braking systems (e.g., brake assist and active brake assist).

In another non-limiting embodiment, the AI 440 can be used to analyze the wheel speed sensor(s) 275 to improve signal accuracy, estimate tire cohesion, and support autonomous driving systems.

In a further non-limiting embodiment, the machine learning models of the AI 440 can be used to analyze the data from the rain sensor 280 to accurately distinguish between ordinary raindrops and other types of impurities (e.g., dirt or snow) to improve the automation efficiency of spaces.

In a non-limiting example, the machine learning models of the AI 440 can be used to analyze the data from the light sensor 285 to improve accuracy in distinguishing between different lighting conditions (e.g., tunnel versus sunset) thereby intelligently adjusting lighting intensity.

Preventive Maintenance

The AI 440 can predict the failure of sensors based on historical data and real-time sensor readings. In certain non-limiting embodiments, the AI 440 can detect gradual sensor degradation which can lead to inaccurate reading and potentially affect engine performance. Also, the AI 440 can estimate the probability of failure based on the identified patterns and historical data.

In some non-limiting embodiments, sensors that tend to fail can include oxygen sensor (the first oxygen sensor 235 and/or the second oxygen sensor 240), MAF sensor 115, and KS 135.

In an embodiment, the AI 440 can predict the likelihood of the oxygen sensor (the first oxygen sensor 235 and/or the second oxygen sensor 240) failing based on factors such as sensor age, operating hours, and historical data on similar sensors. In a non-limiting embodiment in regard to the historical data, the AI 440 can predict the oxygen sensor failure by analyzing the historical data of fuel correction coefficients (fuel trim) and the oxygen sensor response speed and comparing them to the readings from the MAF sensor 115 and driving conditions to identify deviations that preceded failure.

In another embodiment, the AI 440 can estimate the probability of the MAF sensor 115 malfunctioning based on sensor readings (e.g., inaccurate readings), historical data, and driving conditions. In this regard, the AI 440 can estimate the failure of the MAF sensor 115 by analyzing the constant deviations of the long-term fuel correction (LTFT) of the MAF sensor 115 as historical data and comparing the historical data of the MAF sensor 115 with the expected readings from the MAP sensor 140 and the oxygen sensor (the first oxygen sensor 235 and/or the second oxygen sensor 240) under different driving conditions (e.g., idle and full load).

In an additional embodiment, the AI 440 can predict the likelihood of the KS 135 failing based on sensitivity, response time, and driving conditions. In this regard, the AI 440 can predict the failure of the KS 135 (also known as concussion sensor) by analyzing historical deterioration in the KS 135 sensitivity and response time, and comparing the analysis to readings from the CKP sensor 125 and the engine load sensors (e.g., MAP sensor 140, MAF sensor 115, and TPS sensor 120) to determine whether concussion (which is expected based on driving conditions) is being recorded correctly or not.

In an embodiment, the AI 440 can be used to analyze the data from the temperature sensor 290 of the ECT and the IAT for predictive fault diagnosis by analyzing subtle deviations in temperature readings that may indicate an impending problem with the internal combustion engine 105.

In a supplementary embodiment, the AI 440 can estimate the remaining lifespan of the spark plug(s) 210 based on usage patterns, engine load, and historical data on spark plug wear.

In a further embodiment, the AI 440 can predict the probability of the fuel injector(s) 250 clogging or failure based on fuel quality, driving habits, and historical data. In this regard, the AI 440 can predict fuel injector(s) 250 clogging or failure by analyzing the constant deviations of the long-term fuel correction (LTFT) of the MAF sensor 115 as historical data and comparing the historical data of the MAF sensor 115 with the oxygen sensor (the first oxygen sensor 235 and/or the second oxygen sensor 240) and the fuel sensor 265 readings including data from the CKP sensor 125 to identify the cylinder 205 in which combustion failure occurs due to increased blockage as a result of poor quality of fuel used.

In an embodiment, the AI 440 can estimate the remaining life of a timing belt (not shown) based on mileage, engine hours, and historical data on timing belt failures.

In another embodiment, the AI 440 can predict the likelihood of coolant leaks or thermostat (not shown) malfunctions based on coolant temperature, pressure, and historical data of the coolant.

In an additional embodiment, the AI 440 can estimate the probability of ignition coil failures or other ignition-related issues based on misfire data, engine performance, and historical data. In this regard, the AI 440 can estimate failures of the ignition coil by analyzing the historical height of combustion failures (misfires) for each cylinder 205, and comparing the analysis with readings from the CKP sensor 125 and the TPS sensor 120 to determine spark weakness under high load conditions.

In a supplemental embodiment, the AI 440 can predict the likelihood of fuel pump (not shown) failures or fuel line (not shown) blockages based on fuel pressure, flow rate of the fuel, and historical data. In this regard, the AI 440 can estimate fuel pump failure or fuel line blockage by analyzing historical and persistent drop in fuel pressure (measured by the fuel sensor(s) 265) and the positive rise in the long-term fuel correction (LTFT) and comparing the analysis with the TPS sensor 120 data to determine pump vulnerability under high demand conditions.

In a further embodiment, the AI 440 can estimate the probability of the catalytic converter 110 failure based on oxygen sensor readings, emissions data, and historical data of the emission.

In an embodiment, the AI 440 can predict the likelihood of exhaust gas recirculation (EGR) valve or EGR cooler (not shown) failures based on EGR flow data, engine performance, and historical data. In this regard, the AI 440 can predict failure of the EGR valve or EGR cooler by analyzing historical deviations in combustion efficiency. The historical deviations in combustion efficiency can be obtained by comparing the oxygen sensor (the first oxygen sensor 235 and/or the second oxygen sensor 240) and the MAF sensor 115 with exhaust temperature sensor (not shown) levels to determine whether the temperature and flow are proportional to the engine operating mode and load or not.

In a non-limiting example, the AI 440 can analyze data from the nitrous oxide sensor (not shown), oxygen sensor (the first oxygen sensor 235 and/or the second oxygen sensor 240), and engine load (via the TPS sensor 120, CKP sensor 125, MAF sensor 115, and/or MAP sensor 140) to determine the optimal amount of EGR. The AI 440 can use the analyzed data to control the EGR valve to adjust the amount of exhaust gas recirculated.

As demonstrated above, the AI 440 can predict potential engine problems based on historical data and sensor readings thereby allowing for proactive maintenance and reduction in downtime. Specifically, the AI 440 can monitor engine health by analyzing sensor data patterns and identifying potential issues before they become critical failures. Predictive maintenance is a proactive approach to maintenance that aims to anticipate and prevent equipment failures before they occur. It relies heavily on data analytics and machine learning techniques to analyze sensor data and identify potential issues.

In an embodiment, the AI 440 can recommend optimal maintenance schedules based on the predicted component wear and driving conditions. The AI 440 can help optimize maintenance schedules by identifying components that require more frequent inspections or replacements. The AI 440 can provide personalized maintenance recommendations based on individual driving habits and vehicle usage. The AI 440 can generate alerts to notify the driver or mechanic of potential issues before they become critical.

In an embodiment, the alerts can be severity-based alerts, automated alert systems, and an escalation procedure. The alerts delivery methods can be via email, text messages, in-app notifications, push notifications. The types of alerts can be equipment failure alerts, anomaly detection alerts, maintenance alerts, and security alerts.

By effectively prioritizing risks and delivering timely alerts, the AI 440 can help prevent costly equipment failures, improve operational efficiency, and ensure the safety of personnel and assets.

Modification of the Unmodified Engine for Frying Oil

Figure 5:
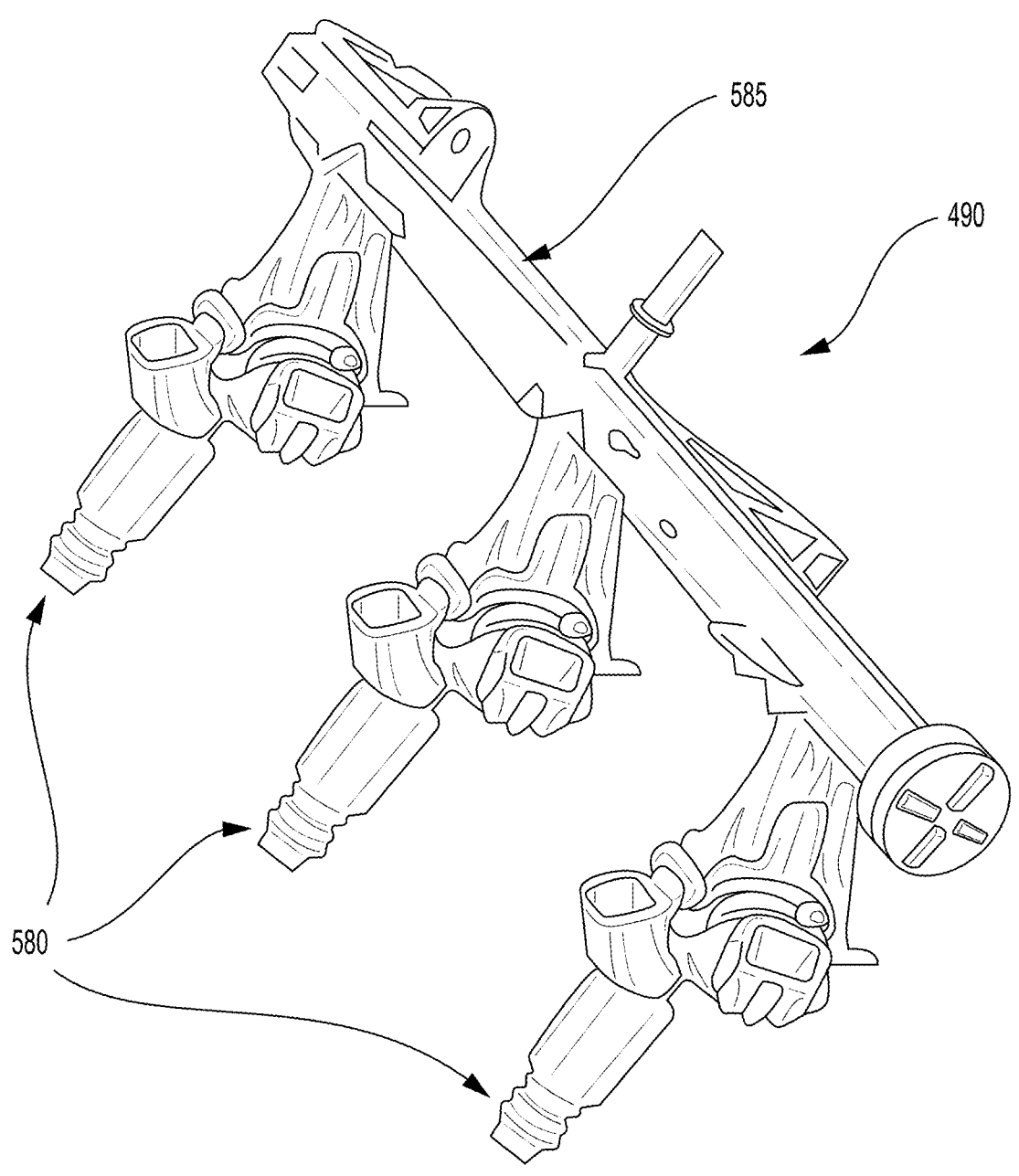
FIG. 5 depicts a biodiesel injector.

In an embodiment, the internal combustion engine 105 can be modified to accommodate frying oil as a fuel source for powering the internal combustion engine 105. In this regard, a biodiesel injector 490 can include several fuel injectors 580 which can be mounted on a common fuel rod 585 as shown in FIG. 5. The biodiesel injectors 490 can be mounted on top of the engine block 200 near the intake manifold 215. The biodiesel injector 490 can be one or more biodiesel injector 490. The biodiesel injector 490 can be configured to handle viscosity and properties of biodiesel fuel for injecting into the cylinder 205 (combustion chamber which can be modified as described herein) of a diesel engine of a biodiesel-powered vehicle.

The biodiesel-powered vehicle can include an in-line heat exchanger (not shown) located between a fuel tank (not shown) and a fuel filter (not shown) for warming up the biodiesel before it is injected into the engine block 200, thereby ensuring efficient combustion and preventing fuel gelling.

The biodiesel-powered vehicle can also include a fuel rail heater 485, as depicted in FIG. 6, which can be located on the fuel rail (not shown), near the biodiesel injector(s) 490. The fuel rail heater 485 can use electrical resistance to heat the biodiesel fuel directly.

Figure 7:
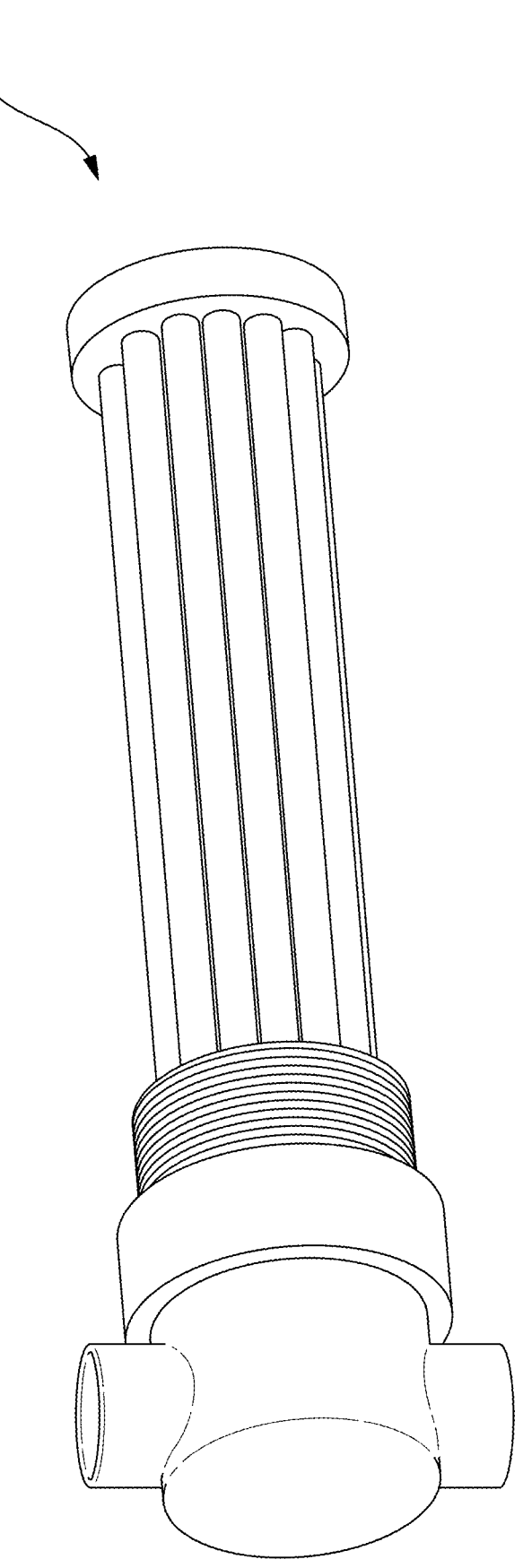
FIG. 7 depicts a pre-heating system.

The biodiesel-powered vehicle can further include pre-heating systems 495, as shown in FIG. 7, which can be located on in the engine compartment near the fuel lines or fuel tank.

In an embodiment, the piston 195 and the cylinder 205 of the internal combustion engine 105 can be modified to provide optimal compression and combustion, reduce emissions, and improve fuel economy for biodiesel.

Figure 8:
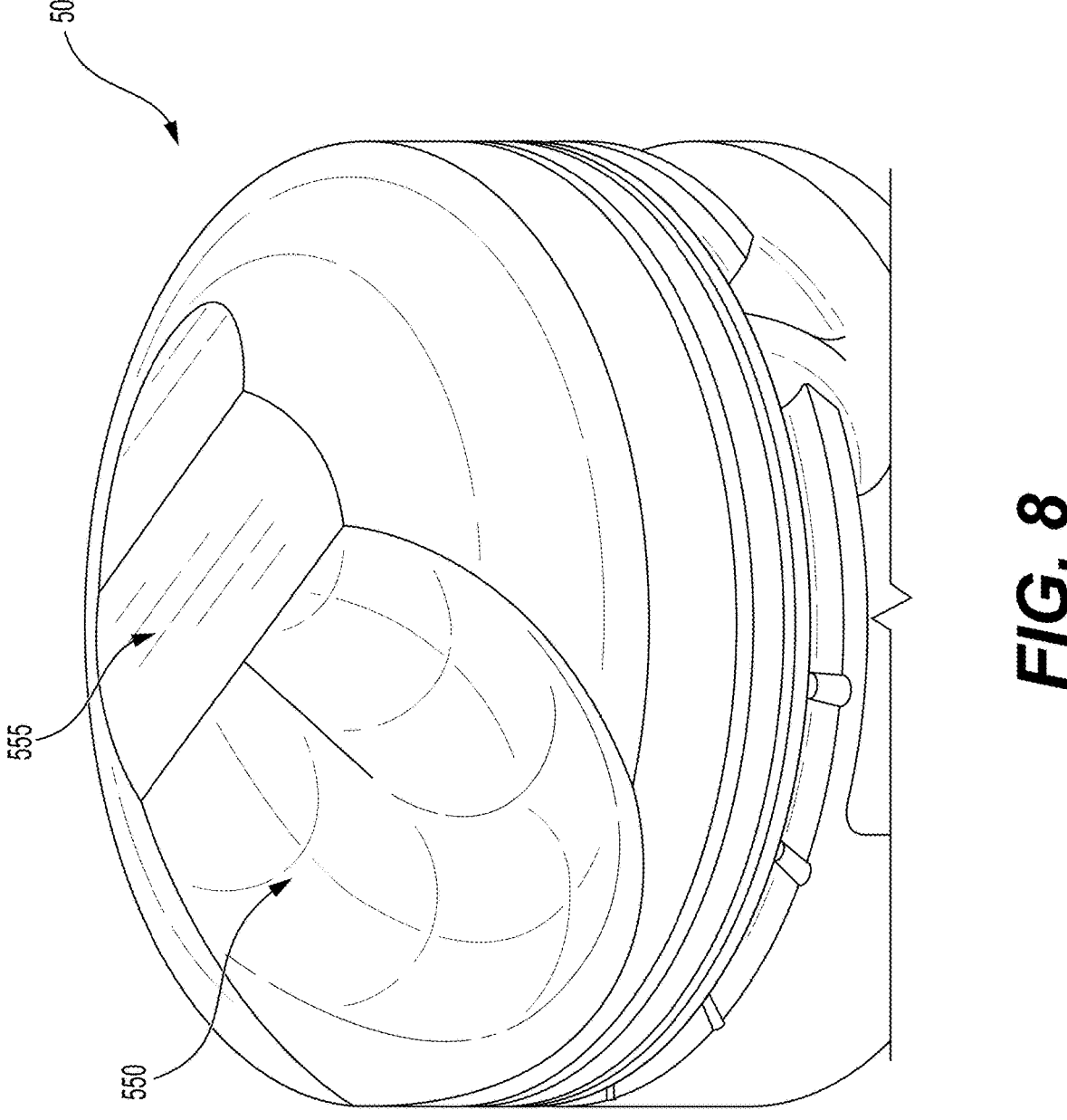
FIG. 8 depicts a dish piston according to a first embodiment.

In this regard, according to a first embodiment, the piston 195 can be replaced with a dish piston 500 as illustrated in FIG. 8. The dish piston 500 can include a concave dish-shaped surface 550 on a crown 555. The concave dish-shaped surface 550 can be configured to direct fuel spray during direct injection and improve fuel-air mixing. The dish piston 500 can be configured to move inside the cylinder 205. The dish piston 500 can improve compression ratio and help control pre-ignition of biodiesel fuels.

Figure 9:
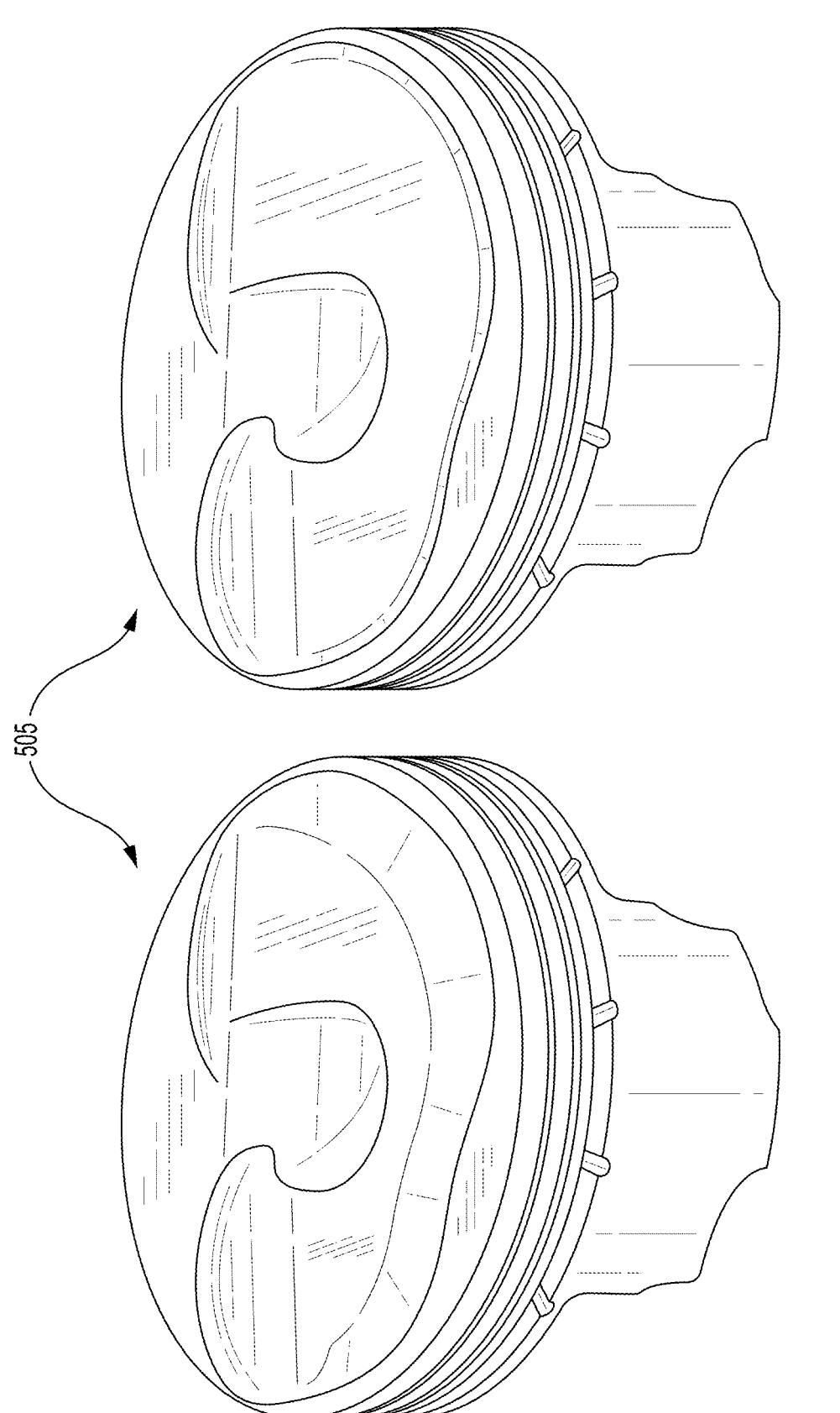
FIG. 9 depicts a flat top piston according to a second embodiment.

According to a second embodiment, the piston 195 can be replaced with a flat top piston 505 as depicted in FIG. 9. The flat top piston 505 can include a piston with a flat top surface. The flat top piston 505 can provide higher power output and better fuel economy when the fuel source is biodiesel.

Figure 10:
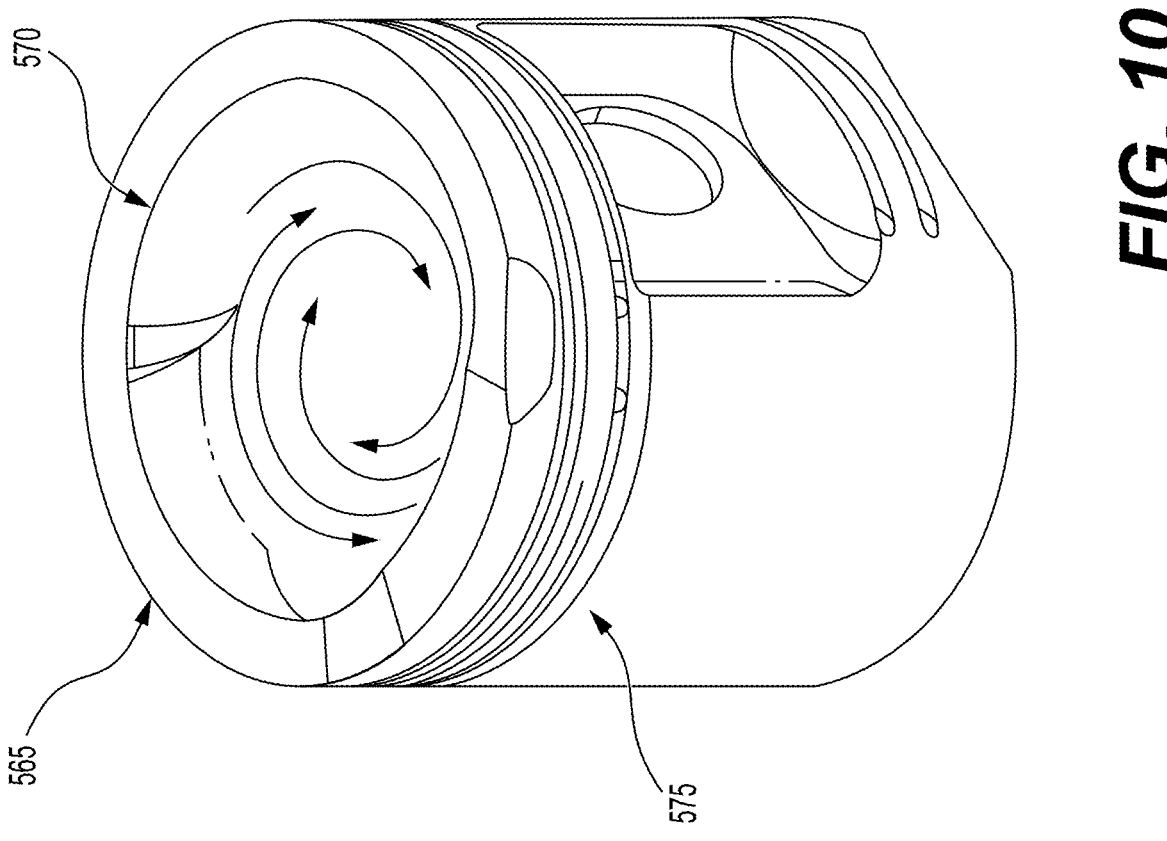
FIG. 10 depicts a swirl-optimized position according to a third embodiment.

According to a third embodiment, the piston 195 can be replaced with a swirl-optimized piston 560 as shown in FIG. 10. The swirl-optimized piston 560 can include a piston 560 with a specially designed crown 565 to create a swirling motion in a combustion bowl 570. The swirl-optimized piston 560 can also include a squish lip 575 which is an air deflector. The swirl-optimized piston 560 can improve fuel-air mixing and reduce emissions when the fuel source is biodiesel.

As mentioned previously, the cylinder 205 of the internal combustion engine 105 can be modified. According to this embodiment, the geometry of the cylinder 205 can be modified to increase the compression ratio thereby improving fuel economy, power output, increasing combustion efficiency, and reducing emissions. Likewise, the shape of the cylinder 205 can be modified to optimize the fuel-air mixture, improve combustion, improve fuel economy, and reduce emissions.

In this regard and in a non-limiting embodiment, the best compression ratio and fuel-air mixture can be achieved by modifying the geometry of the cylinder 205 with a reinserted elliptical piston cavity design (re-entrant toroidal piston bowl geometry (RTPBG)) or a design similar to an omega. By way of non-limiting example, one possible combustion chamber geometry to achieve a best compression ratio and fuel-air mixture is the reinserted elliptical piston cavity design (Re-entrant Toroidal Piston Bowl Geometry-RTPBG) or a design similar to Omega (Omega), where this is achieved via:

1-High compression ratio: Reducing the clearance volume (Clearance Volume) by designing the piston crown to become almost flat in the circumference, while keeping the cavity (vessel) in the middle, which raises the ratio.

2-Perfect combination (Swirl & Turbulence): Deep circular and concave cavity design (Toroidal/Omega) with pressure edge (Squish Lip) to enhance vortex (Swirl) and turbulence in the air, ensuring fast and complete mixing of compressed and hot air sprayed fuel.

In a non-limiting embodiment, a combination of piston and cylinder geometry modifications can provide the best results for biodiesel-powered engines. For example, a dish piston 500 (FIG. 8) with a higher compression ratio and a swirl-optimized combustion chamber can optimize combustion and reduce emissions.

Figure 11:
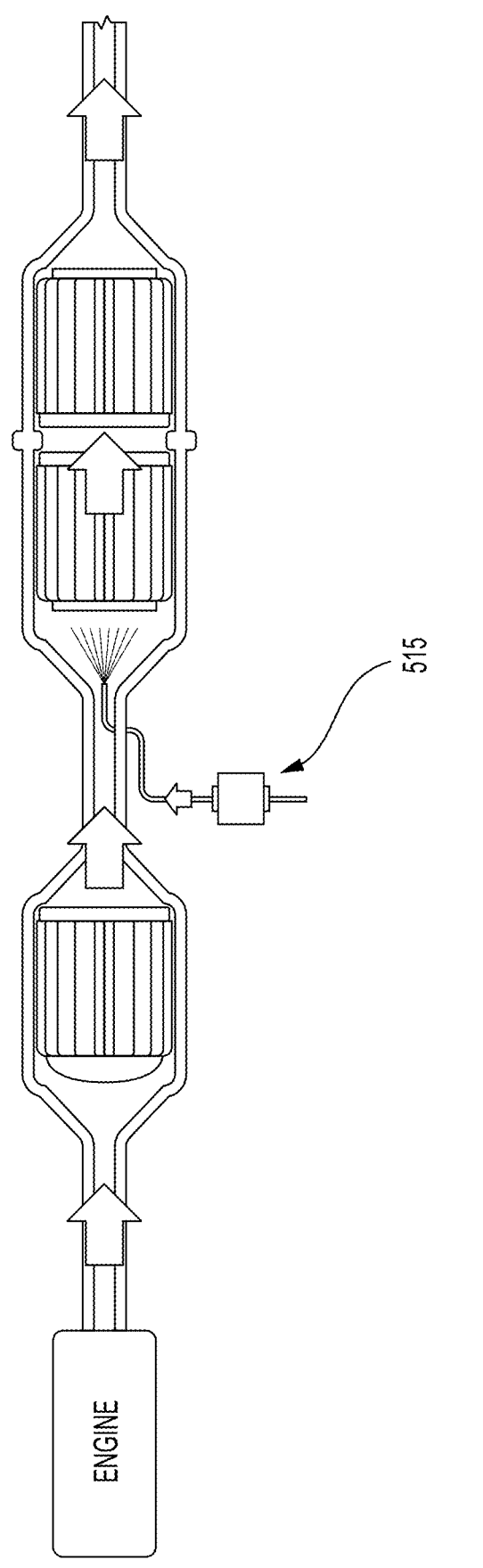
FIG. 11 depicts a diesel emission control system.

In an embodiment, the catalytic converter 110 of the vehicle 100 can be converted into a diesel emissions control system 510 as shown in FIG. 11. The diesel emissions control system 510 can ensure compliance with environmental regulations while minimizing harmful emissions.

In an embodiment, urea-based agent, AdBlue, can be injected into an exhaust stream of the diesel emissions control system 510 via an injection point 515 to reduce nitrous emissions as depicted in FIG. 11.

In an embodiment, specialized lubricants can be used with biodiesel in a biodiesel-powered vehicle for ensuring proper lubrication, help protect the engine components from corrosion, and reduce emissions (e.g., particulate matter and nitrogen oxides). The specialized lubricants can be synthetic blend lubricant, fully synthetic lubricant, bio-based lubricant, other specialized lubricants, and a combination thereof.

It is to be understood that the system and the method for adjusting at least one engine parameter in a vehicle is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A system comprising:
　a primary cloud-based data repository configured to contain at least one of maintenance records data of a vehicle, weather data, and traffic data;
　a secondary cloud-based data repository;
　the vehicle, wherein the vehicle comprises:
　　an internal combustion engine comprising at least one engine sensor;
　　a catalytic converter comprising at least one oxygen sensor;
　　a primary data acquisition unit configured to receive and condition signals from the at least one engine sensor and the at least one oxygen sensor;
　　an electronic control unit (ECU) configured to receive the conditioned signals from the at least one engine sensor and the at least one oxygen sensor and generate at least one engine data and at least one oxygen amount data, respectively, therefrom; and
　　a telematics control unit (TCU) configured to receive and transmit the at least one engine data and the at least one oxygen amount data from the ECU to the secondary cloud-based data repository, respectively;
　a primary artificial intelligence module, within a primary cloud server, configured to receive and train the at least one engine data and the at least one oxygen amount data from the secondary cloud-based data repository and/or the at least one of maintenance records data of the vehicle, weather data, and traffic data from the primary cloud-based data repository; and
　a secondary cloud server configured to receive and transmit the trained at least one engine data and the at least one oxygen amount data from the primary artificial intelligence module to the ECU, respectively, via the TCU thereby allowing the ECU to adjust at least one engine parameter.

2. The system of claim 1, wherein the at least one engine sensor is selected from the group consisting of a mass air flow sensor, a throttle position sensor, a crankshaft position sensor, a camshaft position sensor, a knock sensor, a manifold absolute pressure sensor, a coolant temperature sensor, an intake air temperature sensor, an oil pressure sensor, a vehicle speed sensor, other engine sensors, and a combination thereof.

3. The system of claim 2, wherein the primary data acquisition unit is further configured to receive and condition at least one signal from at least one vehicle auxiliary sensor.

4. The system of claim 3, further comprising:
　wherein the ECU is further configured to receive the conditioned at least one signal from the at least one vehicle auxiliary sensor and generate at least one vehicle auxiliary data therefrom; and
　wherein the TCU is further configured to receive and transmit the at least one vehicle auxiliary data from the ECU to the secondary cloud-based data repository, respectively.

5. The system of claim 4, further comprising:
　wherein the primary artificial intelligence module is further configured to receive and train the at least one vehicle auxiliary data from the secondary cloud-based data repository; and
　wherein the secondary cloud server is further configured to receive and transmit the trained at least one vehicle auxiliary data from the primary artificial intelligence module to the ECU, respectively, via the TCU.

6. The system of claim 3, wherein the at least one vehicle auxiliary sensor is selected from the group consisting of a transmission sensor, a vibration sensor, a fuel sensor, a brake pressure sensor, a wheel speed sensor, an environmental sensor, a rain sensor, a light sensor, a temperature sensor, a radar sensor, a lidar sensor, a GPS sensor, an accelerometer sensor, a gyroscope sensor, other vehicle auxiliary sensors, and a combination thereof.

7. The system of claim 5, further comprising a secondary data acquisition unit configured to receive and condition the at least one of maintenance records data of the vehicle, weather data, and traffic data from the primary cloud-based repository, and wherein the conditioned at least one of maintenance records data of the vehicle, weather data, and traffic data are transmitted to the secondary cloud-based data repository prior to the training step.

8. The system of claim 1, further comprising at least one traffic sensor configured to send data to the primary cloud-based data repository to generate the traffic data, and wherein the at least one traffic sensor is further configured to receive the trained traffic data from the primary artificial intelligence module to regulate traffic flow.

9. The system of claim 8, wherein the at least one traffic sensor is selected from the group consisting of a camera, a radar, an inductive loop, other traffic sensors, and a combination thereof.

10. The system of claim 1, wherein the ECU comprises a secondary artificial intelligence unit embedded therein.

11. The system of claim 10, wherein the secondary artificial intelligence unit is configured for image processing and/or verifying integrity of critical decision(s) made by the primary artificial intelligence module.

12. The system of claim 1, wherein the TCU comprises a tertiary artificial intelligence unit embedded therein.

13. The system of claim 1, wherein adjustment of the at least one engine parameter to be adjusted permits the internal combustion engine of the vehicle to operate using an alternative fuel.

14. The system of claim 13, wherein the alternative fuel is biofuel.

15. The system of claim 14, wherein the biofuel is used cooking oil.

16. A method of using the system of claim 1 for adjusting the at least one engine parameter of the vehicle, the method comprising:

receiving, via the primary cloud-based data repository, the at least one of maintenance records data of a vehicle, weather data, and traffic data;

receiving and conditioning, via the primary data acquisition unit, the signals from the at least one engine sensor and the at least one oxygen sensor;

receiving, via the ECU, the conditioned signals from the at least one engine sensor and the at least one oxygen sensor and generating the at least one engine data and the at least one oxygen amount data, respectively, therefrom;

receiving and transmitting, via the TCU, the at least one engine data and the at least one oxygen amount data from the ECU to the secondary cloud-based data repository, respectively;

receiving and training, via the primary artificial intelligence module, the at least one engine data and the at least one oxygen amount data from the secondary cloud-based data repository and/or the at least one of maintenance records data of the vehicle, weather data, and traffic data from the primary cloud-based data repository; and receiving and transmitting, via the secondary cloud server, the trained at least one engine data and the at least one oxygen amount data from the primary artificial intelligence module to the ECU, respectively, via the TCU thereby allowing the ECU to adjust the at least one engine parameter.

17. The method of claim 16, further comprising receiving and conditioning, via a secondary data acquisition unit, the at least one of maintenance records data of the vehicle, weather data, and traffic data from the primary cloud-based repository, and transmitting the conditioned at least one of maintenance records data of the vehicle, weather data, and traffic data to the secondary cloud-based data repository prior to the training step.

18. The method of claim 16, further comprising sending, via at least one traffic sensor, data to the primary cloud-based data repository to generate the traffic data, and receiving, via the at least one traffic sensor, the trained traffic data from the primary artificial intelligence module to regulate traffic flow.

19. The method of claim 16, wherein the ECU comprises a secondary artificial intelligence unit embedded therein.

20. The method of claim 19, wherein the secondary artificial intelligence unit is configured for image processing and/or verifying integrity of critical decision(s) made by the primary artificial intelligence module.

\*   \*   \*   \*   \*